US011762817B2

(12) United States Patent
Talagala et al.

(10) Patent No.: US 11,762,817 B2
(45) Date of Patent: Sep. 19, 2023

(54) TIME SEQUENCE DATA MANAGEMENT

(71) Applicant: SanDisk Technologies LLC, Addison, TX (US)

(72) Inventors: Nisha Talagala, Livermore, CA (US); Swaminathan Sundararaman, Santa Clara, CA (US); Sriram Subramanian, Santa Clara, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 1101 days.

(21) Appl. No.: 16/394,926

(22) Filed: Apr. 25, 2019

(65) Prior Publication Data

US 2019/0251067 A1    Aug. 15, 2019

Related U.S. Application Data

(63) Continuation of application No. 13/939,992, filed on Jul. 11, 2013, now Pat. No. 10,318,495, which is a continuation-in-part of application No. 13/830,809, filed on Mar. 14, 2013, now Pat. No. 10,509,776.

(60) Provisional application No. 61/829,865, filed on May 31, 2013, provisional application No. 61/812,695, filed on Apr. 16, 2013, provisional application No. 61/726,316, filed on Nov. 14, 2012, provisional application No. 61/705,058, filed on Sep. 24, 2012.

(51) Int. Cl.
G06F 16/00    (2019.01)
G06F 16/21    (2019.01)
G06F 11/14    (2006.01)

(52) U.S. Cl.
CPC .......... *G06F 16/21* (2019.01); *G06F 11/1448* (2013.01); *G06F 11/1471* (2013.01); *G06F 11/1466* (2013.01)

(58) Field of Classification Search
CPC .. G06F 16/21; G06F 11/1448; G06F 11/1471; G06F 11/1466; G06F 3/0616; G06F 3/065; G06F 3/0679
See application file for complete search history.

(56) References Cited

U.S. PATENT DOCUMENTS 8,589,362 B1 * 11/2013 Braam ................ G06F 16/1865
                                                          709/224
8,930,648 B1 *  1/2015 Storer .................. G06F 3/0641
                                                          711/161
9,489,434 B1 * 11/2016 Rath ....................... G06F 16/25
10,102,144 B2  10/2018 Sundararaman et al.
10,318,495 B2   6/2019 Talagala et al.
10,509,776 B2  12/2019 Talagala et al.
(Continued)

OTHER PUBLICATIONS

U.S. Appl. No. 13/830,809 (230.2.107), Notice of Allowance, dated Aug. 2, 2019.
(Continued)

*Primary Examiner* — Paul Kim
(74) *Attorney, Agent, or Firm* — Kunzler Bean & Adamson

(57) ABSTRACT

Apparatuses, systems, and methods are disclosed for snapshots of a non-volatile device. A method includes writing data in a sequential log structure for a non-volatile device. A method includes marking a point, in a sequential log structure, for a snapshot of data. A method includes preserving a logical-to-physical mapping for a snapshot based on a marked point and a temporal order for data in a sequential log structure.

20 Claims, 18 Drawing Sheets

(56) References Cited

U.S. PATENT DOCUMENTS

| | | |
|---|---|---|
| 10,558,561 B2 | 2/2020 | Piggin et al. |
| 2002/0129294 A1* | 9/2002 | Pedone ................. H04L 1/22 |
| | | 714/4.3 |
| 2008/0222219 A1* | 9/2008 | Varadarajan .......... G06F 16/128 |
| 2009/0249001 A1* | 10/2009 | Narayanan ............ G06F 3/0634 |
| | | 713/324 |
| 2014/0089265 A1 | 3/2014 | Talagala et al. |
| 2014/0344507 A1 | 11/2014 | Piggin et al. |

OTHER PUBLICATIONS

U.S. Appl. No. 14/253,721 (230.2.155), Notice of Allowance, dated Sep. 23, 2019.
U.S. Appl. No. 14/253,721 (230.2.155), Office Action, dated Jan. 25, 2019.

* cited by examiner

TIME SEQUENCE DATA MANAGEMENT

CROSS-REFERENCES TO RELATED APPLICATIONS

This application is a continuation application of U.S. patent application Ser. No. 13/939,992 entitled "SNAPSHOTS FOR A NON-VOLATILE DEVICE" and filed on Jul. 11, 2013 for Nisha Talagala et al., which is a continuation-in-part application of and claims priority to U.S. patent application Ser. No. 13/830,809 entitled "TIME SEQUENCE DATA MANAGEMENT" and filed on Mar. 14, 2013 for Nisha Talagala et al., and which claims the benefit of U.S. Provisional Patent Application No. 61/705,058 entitled "APPARATUS, SYSTEM, AND METHOD FOR SNAPSHOTS IN A STORAGE DEVICE" and filed on Sep. 24, 2012 for Nisha Talagala et al., of U.S. Provisional Patent Application No. 61/726,316 entitled "APPARATUS, SYSTEM, AND METHOD FOR SNAPSHOTS IN A STORAGE DEVICE" and filed on Nov. 14, 2012 for Nisha Talagala et al., of U.S. Provisional Patent Application No. 61/812,695 entitled "SYSTEMS AND METHODS FOR STORAGE CLONING OPERATIONS" and filed on Apr. 16, 2013 for David Flynn et al., and of U.S. Provisional Patent Application No. 61/829,865 entitled "SNAPSHOTS FOR A NON-VOLATILE DEVICE" and filed on May 31, 2013 for Nisha Talagala et al., each of which are incorporated herein by reference.

TECHNICAL FIELD

The present disclosure, in various embodiments, relates to snapshots for data and more particularly relates to snapshots for sequentially stored data.

BACKGROUND

Storage clients often use backups of data to prevent data loss, to rollback failed data transactions, to access data from multiple locations, or the like. Creating a backup of data can be a time and resource intensive process, as large portions of data are copied for the backup. A backup process can prevent or slow other access to the data while the backup is being made.

Additionally, backups of data are often made at busy, high-use times. For example, prior to a large transaction on data, a storage client may first create a backup of the data in case the transaction fails. Performing backups of data during busy, high-use times may magnify the negative effects the backup process has on other access to the data.

SUMMARY

Methods are presented for snapshots of data. A method, in one embodiment, includes writing data in a sequential log structure for a non-volatile device. In a further embodiment, a method includes marking a point, in a sequential log structure, for a snapshot of data. A method, in certain embodiments, includes preserving a logical-to-physical mapping for a snapshot based on a marked point and a temporal order for the data in a sequential log structure.

Apparatuses are presented for snapshots of data. In one embodiment, a log storage module is configured to store data sequentially to an append point of a chronologically ordered writing structure. A creation module, in a further embodiment, is configured to initialize a snapshot in a chronologically ordered writing structure in response to a creation event for the snapshot. In certain embodiments, an activation module is configured to activate a snapshot in response to an activation event for the snapshot. An activation module, in a further embodiment, is configured to activate a snapshot by processing a chronologically ordered writing structure to determine a logical-to-physical mapping structure for the snapshot.

In one embodiment, an apparatus includes means for preserving a temporal order of data in a sequential writing structure in the presence of storage capacity recovery operations for the sequential writing structure. An apparatus, in a further embodiment, includes means for preserving a copy of data at a point in time in a sequential writing structure. An apparatus, in certain embodiments, includes means for activating a snapshot at a later point in time based on a preserved temporal order of data in a sequential writing structure.

Systems are presented for snapshots of data. In one embodiment, a system includes a recording device configured to store data in a sequential, log-based writing structure. A system, in a further embodiment, includes a snapshot module configured to provide access to snapshots of data at different points of time in a sequential, log-based writing structure. In certain embodiments, a system includes a temporal order module configured to mark temporal ranges of data in a sequential, log-based writing structure with epoch identifiers to preserve a temporal order of the data in the sequential, log-based writing structure. A temporal order module, in a further embodiment, is configured to increment an epoch identifier for marking a temporal range in response to a snapshot module performing a snapshot operation.

Computer program products are presented comprising a computer readable storage medium storing computer usable program code executable to perform operations for snapshots of data. In one embodiment, an operation includes maintaining validity metadata for a plurality of snapshots for data of a non-volatile memory device. An operation, in a further embodiment, includes determining which data of a storage region is valid for at least one of a plurality of snapshots. In certain embodiments, an operation includes writing data determined to be valid for at least one of a plurality of snapshots to a different storage region in response to a storage capacity recovery event for a storage region.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1A:
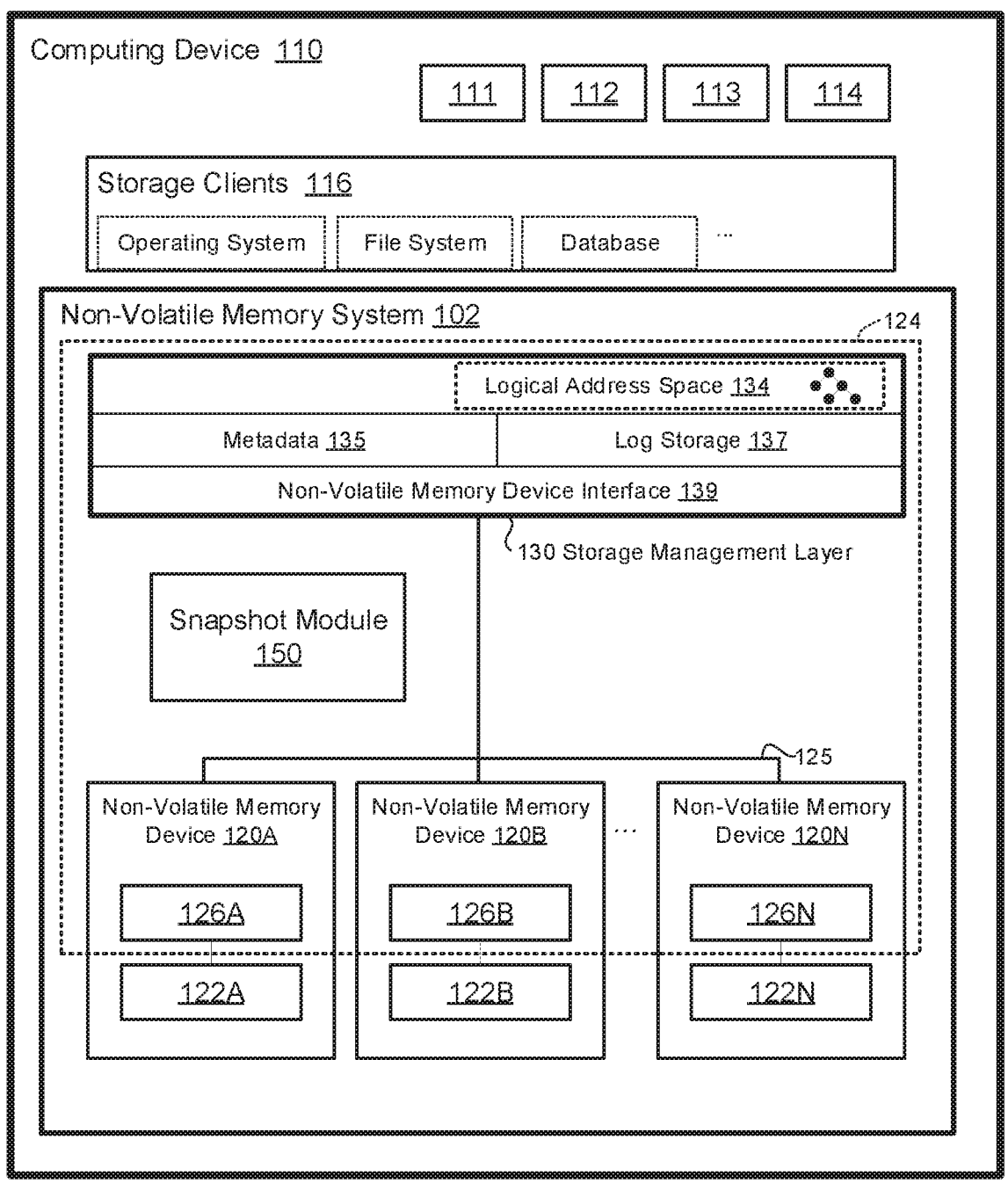
FIG. 1A is a schematic block diagram of one embodiment of a system for snapshots of data.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), phase change memory (PCM or PRAM), a portable compact disc read-only memory (CD-ROM), a digital versatile disc (DVD), a blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising,"

"having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

According to various embodiments, a non-volatile memory controller manages one or more non-volatile memory devices. The non-volatile memory device(s) may comprise memory or storage devices, such as solid-state storage device(s), that are arranged and/or partitioned into a plurality of addressable media storage locations. As used herein, a media storage location refers to any physical unit of memory (e.g., any quantity of physical storage media on a non-volatile memory device). Memory units may include, but are not limited to: pages, memory divisions, erase blocks, sectors, blocks, collections or sets of physical storage locations (e.g., logical pages, logical erase blocks, described below), or the like.

The non-volatile memory controller may comprise a storage management layer (SML), which may present a logical address space to one or more storage clients. One example of an SML is the Virtual Storage Layer® of Fusion-io, Inc. of Salt Lake City, Utah. Alternatively, each non-volatile memory device may comprise a non-volatile memory media controller, which may present a logical address space to the storage clients. As used herein, a logical address space refers to a logical representation of memory resources. The logical address space may comprise a plurality (e.g., range) of logical addresses. As used herein, a logical address refers to any identifier for referencing a memory resource (e.g., data), including, but not limited to: a logical block address (LBA), cylinder/head/sector (CHS) address, a filename, an object identifier, an inode, a Universally Unique Identifier (UUID), a Globally Unique Identifier (GUID), a hash code, a signature, an index entry, a range, an extent, or the like.

The SML may maintain metadata, such as a forward index or other mapping structure, to map logical addresses of the logical address space to media storage locations on the non-volatile memory device(s). The SML may provide for arbitrary, any-to-any mappings from logical addresses to physical storage resources. As used herein, an "any-to any" mapping may map any logical address to any physical storage resource. Accordingly, there may be no pre-defined and/or pre-set mappings between logical addresses and particular, media storage locations and/or media addresses. As used herein, a media address refers to an address of a memory resource that uniquely identifies one memory resource from another to a controller that manages a plurality of memory resources. By way of example, a media address includes, but is not limited to: the address of a media storage location, a physical memory unit, a collection of physical memory units (e.g., a logical memory unit), a portion of a memory unit (e.g., a logical memory unit address and offset, range, and/or extent), or the like. Accordingly, the SML may map logical addresses to physical data resources of any size and/or granularity, which may or may not correspond to the underlying data partitioning scheme of the non-volatile memory device(s). For example, in some embodiments, the non-volatile memory controller is configured to store data within logical memory units that are formed by logically combining a plurality of physical memory units, which may allow the non-volatile memory controller to support many different virtual memory unit sizes and/or granularities.

As used herein, a logical memory element refers to a set of two or more non-volatile memory elements that are or are capable of being managed in parallel (e.g., via an I/O and/or control bus). A logical memory element may comprise a plurality of logical memory units, such as logical pages, logical memory divisions (e.g., logical erase blocks), and so on. As used herein, a logical memory unit refers to a logical construct combining two or more physical memory units, each physical memory unit on a respective non-volatile memory element in the respective logical memory element (each non-volatile memory element being accessible in parallel). As used herein, a logical memory division refers to a set of two or more physical memory divisions, each physical memory division on a respective non-volatile memory element in the respective logical memory element.

The logical address space presented by the storage management layer may have a logical capacity, which may correspond to the number of available logical addresses in the logical address space and the size (or granularity) of the data referenced by the logical addresses. For example, the logical capacity of a logical address space comprising 2^32 unique logical addresses, each referencing 2048 bytes (2 KiB) of data may be 2^43 bytes. (As used herein, a kibibyte (KiB) refers to 1024 bytes). In some embodiments, the logical address space may be thinly provisioned. As used herein, a "thinly provisioned" logical address space refers to a logical address space having a logical capacity that exceeds the physical capacity of the underlying non-volatile memory device(s). For example, the storage management layer may present a 64-bit logical address space to the storage clients (e.g., a logical address space referenced by 64-bit logical addresses), which exceeds the physical capacity of the underlying non-volatile memory devices. The large logical address space may allow storage clients to allocate and/or reference contiguous ranges of logical addresses, while reducing the chance of naming conflicts. The storage management layer may leverage the any-to-any mappings between logical addresses and physical storage resources to manage the logical address space independently of the underlying physical storage devices. For example, the storage management layer may add and/or remove physical storage resources seamlessly, as needed, and without changing the logical addresses used by the storage clients.

The non-volatile memory controller may be configured to store data in a contextual format. As used herein, a contextual format refers to a self-describing data format in which persistent contextual metadata is stored with the data on the physical storage media. The persistent contextual metadata provides context for the data it is stored with. In certain embodiments, the persistent contextual metadata uniquely identifies the data that the persistent contextual metadata is stored with. For example, the persistent contextual metadata may uniquely identify a sector of data owned by a storage client from other sectors of data owned by the storage client. In a further embodiment, the persistent contextual metadata identifies an operation that is performed on the data. In a further embodiment, the persistent contextual metadata identifies a sequence of operations performed on the data. In a further embodiment, the persistent contextual metadata identifies security controls, a data type, or other attributes of the data. In a certain embodiment, the persistent contextual metadata identifies at least one of a plurality of aspects, including data type, a unique data identifier, an operation, and a sequence of operations performed on the data. The persistent contextual metadata may include, but is not limited to: a logical address of the data, an identifier of the data (e.g., a file name, object id, label, unique identifier, or the like), reference(s) to other data (e.g., an indicator that the data is associated with other data), a relative position or offset of the data with respect to other data (e.g., file offset, etc.), data size and/or range, and the like. The contextual data format may comprise a packet format comprising a data segment and one or more headers. Alternatively, a contextual data format may associate data with context information in other ways (e.g., in a dedicated index on the non-volatile memory media, a memory division index, or the like).

In some embodiments, the contextual data format may allow data context to be determined (and/or reconstructed) based upon the contents of the non-volatile memory media, and independently of other metadata, such as the arbitrary, any-to-any mappings discussed above. Since the media location of data is independent of the logical address of the data, it may be inefficient (or impossible) to determine the context of data based solely upon the media location or media address of the data. Storing data in a contextual format on the non-volatile memory media may allow data context to be determined without reference to other metadata. For example, the contextual data format may allow the metadata to be reconstructed based only upon the contents of the non-volatile memory media (e.g., reconstruct the any-to-any mappings between logical addresses and media locations).

In some embodiments, the non-volatile memory controller may be configured to store data on one or more asymmetric, write-once media, such as solid-state storage media. As used herein, a "write once" storage medium refers to a storage medium that is reinitialized (e.g., erased) each time new data is written or programmed thereon. As used herein, an "asymmetric" storage medium refers to a storage medium having different latencies for different storage operations. Many types of solid-state storage media are asymmetric; for example, a read operation may be much faster than a write/program operation, and a write/program operation may be much faster than an erase operation (e.g., reading the media may be hundreds of times faster than erasing, and tens of times faster than programming the media). The memory media may be partitioned into memory divisions that can be erased as a group (e.g., erase blocks) in order to, inter alia, account for the asymmetric properties of the media. As such, modifying a single data segment in-place may require erasing the entire erase block comprising the data, and rewriting the modified data to the erase block, along with the original, unchanged data. This may result in inefficient "write amplification," which may excessively wear the media. Therefore, in some embodiments, the non-volatile memory controller may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (the erasure latency is no longer part of the critical path of a write operation).

The non-volatile memory controller may comprise one or more processes that operate outside of the regular path for servicing of storage operations (the "path" for performing a storage operation and/or servicing a storage request). As used herein, the "path for servicing a storage request" or "path for servicing a storage operation" (also referred to as the "critical path") refers to a series of processing operations needed to service the storage operation or request, such as a read, write, modify, or the like. The path for servicing a storage request may comprise receiving the request from a storage client, identifying the logical addresses of the request, performing one or more storage operations on non-volatile memory media, and returning a result, such as acknowledgement or data. Processes that occur outside of the path for servicing storage requests may include, but are not limited to: a groomer, de-duplication, and so on. These processes may be implemented autonomously and in the background, so that they do not interfere with or impact the performance of other storage operations and/or requests. Accordingly, these processes may operate independent of servicing storage requests.

In some embodiments, the non-volatile memory controller comprises a groomer, which is configured to reclaim memory divisions (e.g., erase blocks) for reuse. The write out-of-place paradigm implemented by the non-volatile memory controller may result in obsolete or invalid data remaining on the non-volatile memory media. For example, overwriting data X with data Y may result in storing Y on a new memory division (rather than overwriting X in place), and updating the any-to-any mappings of the metadata to identify Y as the valid, up-to-date version of the data. The obsolete version of the data X may be marked as invalid, but may not be immediately removed (e.g., erased), since, as discussed above, erasing X may involve erasing an entire memory division, which is a time-consuming operation and may result in write amplification. Similarly, data that is no longer is use (e.g., deleted or trimmed data) may not be immediately removed. The non-volatile memory media may accumulate a significant amount of invalid data. A groomer process may operate outside of the critical path for servicing storage operations. The groomer process may reclaim memory divisions so that they can be reused for other storage operations. As used herein, reclaiming a memory division refers to erasing the memory division so that new data may be stored/programmed thereon. Reclaiming a memory division may comprise relocating valid data on the memory division to a new location. The groomer may identify memory divisions for reclamation based upon one or more factors, which may include, but are not limited to: the amount of invalid data in the memory division, the amount of valid data in the memory division, wear on the memory division (e.g., number of erase cycles), time since the memory division was programmed or refreshed, and so on.

The non-volatile memory controller may be further configured to store data in a sequential and/or chronologically ordered, log-based writing structure, journal, or the like. A sequential, log-based writing structure or other chronologically ordered and/or log-based format refers to a data format that defines an ordered sequence of storage operations performed on a non-volatile memory media. A journal, in certain embodiments, comprises a sequential and/or chronological record of data operations that may be used to reconstruct, reinstate, or revert to one or more historical or alternative versions of the data. In some embodiments, the log-based format comprises storing data in a pre-determined sequence of media addresses of the non-volatile memory media (e.g., within sequential pages and/or erase blocks of the media). The log-based format may further comprise associating data (e.g., each packet or data segment) with respective sequence indicators such as the epoch identifiers described below. The sequence indicators may be applied to data individually (e.g., applied to each data packet) and/or to data groupings (e.g., packets stored sequentially on a memory division, such as an erase block). In some embodiments, sequence indicators may be applied to memory divisions when the memory divisions are reclaimed (e.g., erased), as described above, and/or when the memory divisions are first used to store data.

In some embodiments a sequential, log-based writing structure may also be "append only." The non-volatile memory controller may maintain a current append point at a media address of the non-volatile memory device. The append point may be a current memory division and/or offset within a memory division. Data may then be sequentially appended from the append point. The sequential ordering of the data, therefore, may be determined based upon the sequence indicator of the memory division of the data in combination with the sequence of the data within the memory division. Upon reaching the end of a memory division, the non-volatile memory controller may identify the "next" available memory division (the next memory division that is initialized and ready to store data). The groomer may reclaim memory divisions comprising invalid, stale, and/or deleted data, to ensure that data may continue to be appended to the sequential, log-based writing structure.

The sequential, log-based writing structure described herein may allow valid data to be distinguished from invalid data based upon the contents of the non-volatile memory media, and independently of other metadata. As discussed above, invalid data may not be removed from the non-volatile memory media until the memory division comprising the data is reclaimed. Therefore, multiple "versions" of data having the same context may exist on the non-volatile memory media (e.g., multiple versions of data having the same logical addresses). The sequence indicators associated with the data may be used to distinguish invalid versions of data from the current, up-to-date version of the data; the data that is the most recent in the sequential, log-based writing structure is the current version, and previous versions may be identified as invalid.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description.

FIG. 1A depicts one embodiment of a system 100 comprising a snapshot module 150 for snapshots of data. The snapshot module 150 may be part of and/or in communication with a storage management layer (SML) 130. The SML 130 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 (and/or non-volatile memory controller 124) to a communication network, such as an Internet Protocol network, a Storage Area Network, or the like.

The computing device 110 may further comprise a non-transitory, computer readable storage media 114. The computer readable storage media 114 may comprise executable instructions configured to cause the computing device 110 (e.g., processor 111) to perform steps of one or more of the methods disclosed herein. Alternatively, or in addition, the storage management layer 130 and/or one or more modules thereof may be embodied as one or more computer readable instructions stored on the non-transitory storage media 114.

The storage management layer 130 may be configured to provide storage services to one or more storage clients 116. The storage clients 116 may include local storage clients 116 operating on the computing device 110 and/or remote, storage clients 116 accessible via the network (and network interface 113). The storage clients 116 may include, but are not limited to: operating systems, file systems, database applications, server applications, kernel-level processes, user-level processes, applications, and the like.

The storage management layer 130 comprises and/or is communicatively coupled to one or more non-volatile memory devices 120A-N. The non-volatile memory devices 120A-N may include different types of non-volatile memory devices including, but not limited to: solid-state storage devices, hard drives, SAN storage resources, or the like. While non-volatile memory devices 120A-N are described herein as an example, in other embodiments, the SML 130, the snapshot module 150, or the like may similarly manage snapshots and service snapshot requests for one or more volatile memory devices, such as random access memory (RAM), dynamic RAM (DRAM), static RAM (SRAM), or the like. Each reference to non-volatile memory herein, may similarly apply to volatile memory.

Figure 1B:
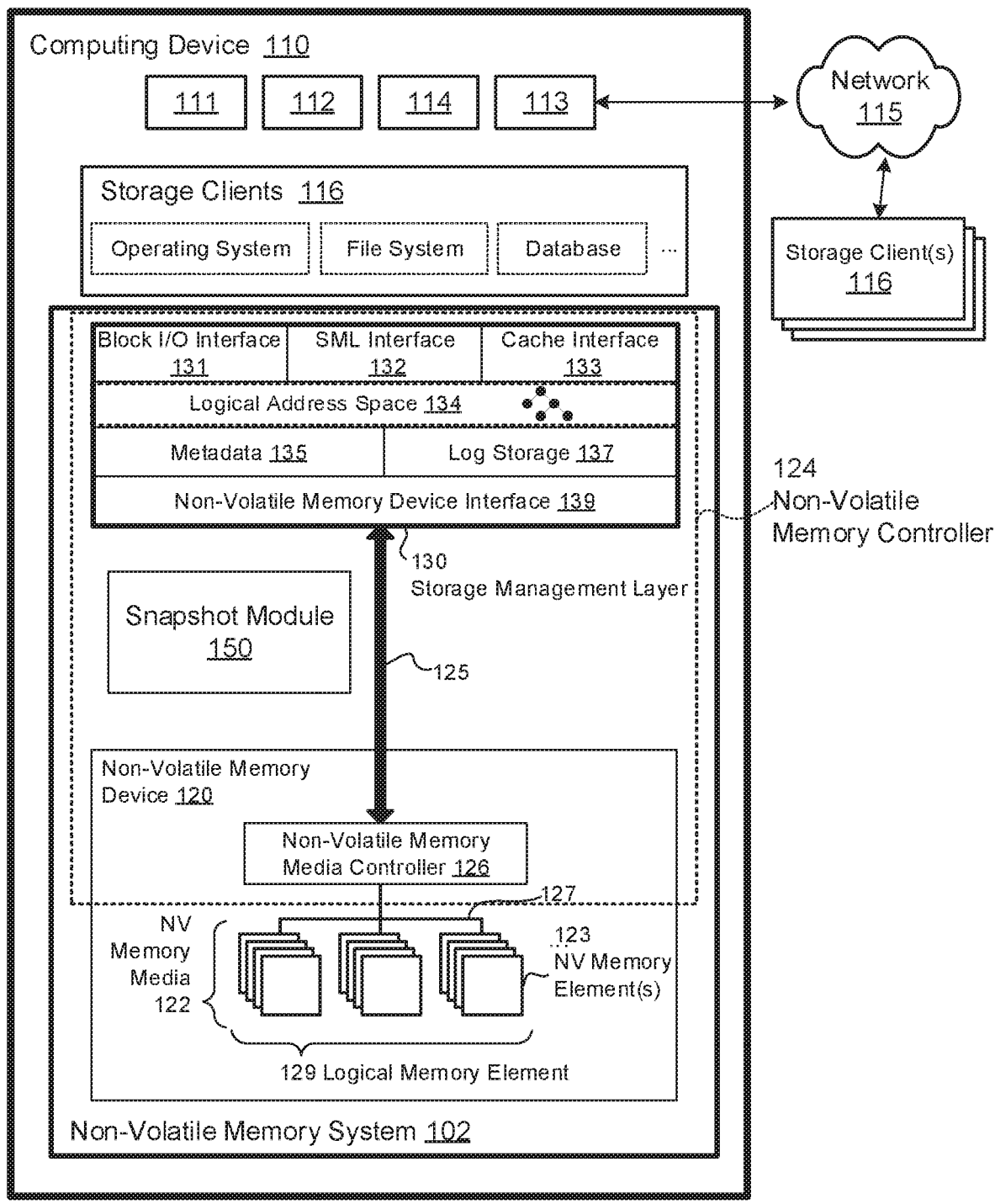
FIG. 1B is a schematic block diagram of another embodiment of a system for snapshots of data.

The non-volatile memory devices 120A-N may comprise respective non-volatile memory media controllers 126A-N and non-volatile memory media 122A-N. As illustrated in FIG. 1B, The SML 130 may provide access to the non-volatile memory devices 120A-N via a traditional block input/output (I/O) interface 131. Additionally, the SML 130 may provide access to enhanced functionality (e.g., large, virtual address space, snapshot requests) through the SML interface 132. The metadata 135 may be used to manage and/or track storage operations performed through any of the block I/O interface 131, SML interface 132, cache interface 133, or other, related interfaces.

The cache interface 133 may expose cache-specific features accessible via the storage management layer 130. Also, in some embodiments, the SML interface 132 presented to the storage clients 116 provides access to data transformations implemented by the non-volatile memory devices 120A-N and/or the non-volatile memory media controllers 126A-N.

The SML 130 may provide storage services through one or more interfaces, which may include, but are not limited to: a block I/O interface, an extended storage management layer interface, a cache interface, and the like. The SML 130 may present a logical address space 134 to the storage clients 116 through one or more interfaces. As discussed above, the logical address space 134 may comprise a plurality of logical addresses, each corresponding to respective media locations on one or more of the non-volatile memory devices 120A-N. The SML 130 may maintain metadata 135 comprising any-to-any mappings between logical addresses and media locations, as described above.

The SML 130 may further comprise a log storage module 137 that is configured to store data in a contextual, log-based format. The contextual, log-based format may comprise associating data with persistent contextual metadata, such as the logical address of the data, or the like. The contextual, log-based format may further comprise associating data with respective sequence identifiers on the non-volatile memory media 122A-N, which define an ordered sequence of storage operations performed on the non-volatile memory devices 120A-N, as described above.

The SML 130 may further comprise a non-volatile memory device interface 139 configured to transfer data, commands, and/or queries to the non-volatile memory devices 120A-N over a bus 125, which may include, but is not limited to: a peripheral component interconnect express (PCI Express or "PCIe") bus, a serial Advanced Technology Attachment (ATA") bus, a parallel ATA bus, a small computer system interface (SCSI"), FireWire, Fibre Channel, a Universal Serial Bus (USB"), a PCIe Advanced Switching (PCIe-AS") bus, a network, Infiniband, SCSI RDMA, or the like. The non-volatile memory device interface 139 may communicate with the non-volatile memory devices 120A-N using input-output control (IO-CTL") command(s), IO-CTL command extension(s), remote direct memory access, or the like.

The non-volatile memory system 102, in the depicted embodiment, includes a snapshot module 150. The snapshot module 150, in certain embodiments, manages and/or provides snapshots for data stored in a sequential, log-based writing structure of the non-volatile memory device 120 to storage clients 116. For example, the snapshot module 150 may support one or more snapshot requests over an interface such as the SML interface 132 described below, providing access to snapshots of data at different points in time in a sequential, log-based writing structure, allowing storage clients 116 to rollback or iterate through different snapshots of data, allowing storage clients 116 to manage snapshots or epochs of data, or otherwise providing access to snapshots of data. In this manner, the SML 130, in cooperation with the snapshot module 150, may provide access to data in both a current or most recent state and to data of one or more snapshots of previous points in time.

A snapshot, as used herein, is a representation of the state of a non-volatile memory device 120, associated data, or a portion thereof at a particular point in time (e.g., a point-in-time representation of the state of a storage system). A storage client 116 may use a snapshot to enable data backup, to rollback or undo a failed transaction on data, as an audit trail for regulatory compliance or the like, for asynchronous replication of data at a separate location, to isolate operations to a copy of data rendering the operation transactional, or the like.

An epoch, as used herein, comprises a set of data, a marker (e.g., an epoch identifier) for a set of data, or the like that is written sequentially in time to the non-volatile memory device 120. Epochs may temporally divide operations (e.g., write data, write packets) by time in the sequential, log-based writing structure of the non-volatile memory device 120. As described below, each epoch may be associated with an epoch identifier or epoch number, which the snapshot module 150 may increment, thereby creating a new epoch, in response to snapshot creation, snapshot activation, and/or in response to another epoch trigger. The snapshot module 150 may use epochs and/or epoch identifiers to maintain a sequential, temporal, and/or chronological order of data in the log-based writing structure, even if a storage capacity recovery process moves or rearranges data in the log-based writing structure.

In certain embodiments, the snapshot module 150 provides snapshots with minimal disruption to foreground I/O traffic of the non-volatile memory device 120 during creation of, deletion of, and/or other operations for a snapshot. The snapshot module 150 may provide snapshots using previous versions of data stored in a sequential, log-based writing structure of the non-volatile memory device 120, to provide snapshots without making a new copy of the snapshotted data. To ensure that creation of a snapshot has little or no impact on other operations for the non-volatile memory device 120, the snapshot module 150 may defer certain portions of snapshot creation until an activation event for the snapshot. For example, at creation time for a snapshot, in response to a create snapshot request or other creation event, the snapshot module 150 may simply write a snapshot-create indicator, such as a snapshot name and/or an epoch identifier, to a sequential, log-based writing structure of the non-volatile memory device 120. The snapshot module 150 may wait until a later point in time, such as an activation event, to determine a logical-to-physical mapping for the snapshot, determine validity metadata for the snapshot, or the like, based on logical addresses, time sequence information such as epoch identifiers, or other metadata preserved in the sequential, log-based writing structure.

In general, storage clients 116 may tend to create more snapshots than they activate (e.g., a portion of created snapshots may never be activated or used). In certain embodiments, storage clients 116 may tend to create snapshots during busy, high-traffic, or peak times, creating a snapshot to backup data in conjunction with a data operation or the like, while a storage client 116 may activate a snapshot an slow, low-traffic, or off-peak times. For at least these reasons, by deferring certain overhead intensive operations, such as scanning the sequential, log-based writing structure to build, construct, and/or populate a logical-to-physical mapping structure for a snapshot, the snapshot module 150 may perform snapshot operations with less of an impact on other storage operations than a snapshot system that copies or backs up large amounts of data at creation time of the snapshot. In this manner, the snapshot module 150 may create snapshots at high speeds (e.g., many snapshots per second), with little or no discernable impact on other storage operations. During more intensive snapshot operations, such as determining a logical-to-physical mapping structure for a snapshot, activating a snapshot, or the like, the snapshot module 150 may mitigate an impact of the operations by rate-limiting background operations on the non-volatile memory device 120, such as a storage capacity recovery process (e.g., grooming, garbage collection, or the like).

In one embodiment, the snapshot module 150 provides snapshots of data based on a sequential, chronological, and/or temporal order of data in the sequential, log-based writing structure of the non-volatile memory device 120. In the presence of storage capacity recovery operations for the sequential, log-based writing structure, which may copy valid data from a recovered storage region to a new location, such as an append point, of the sequential, log-based writing structure, the snapshot module 150 may use the sequential, chronological, and/or temporal order of data along with time sequence information preserved in the sequential, log-based writing structure, such as the epoch identifiers described below.

Time sequence information for data, as used herein, comprises information indicating or otherwise associated with a temporal or chronological order in which data was written to the non-volatile memory device 120. Storage clients 116, in various embodiments, may use time sequence information, or associated services the snapshot module 150 provides, to access multiple historical versions or snapshots of data, to rollback transactions or operations if they fail or the like, to asynchronously replicate data in a temporal order, or to perform other operations based on a temporal order of data. By providing access to snapshots based on time sequence information for data, using a temporal order for the data preserved in an underlying sequential, log-based writing structure that stores the data or the like, in certain embodiments, the storage clients 116 may be relieved of the overhead and complication of creating snapshots and/or maintaining time sequence information themselves.

In one embodiment, the snapshot module 150 may maintain time sequence information (e.g., a temporal order of data, a chronological order of data), as part of the data stored in the sequential, log-based writing structure itself, so that a separate backup copy or historical record does not need to be maintained to provide snapshots of the data. In a further embodiment, the snapshot module 150 may preserve a temporal order of data in the non-volatile memory device 120 across storage capacity recovery operations for the non-volatile memory device 120, during which data may be copied or moved forward to a new location, such as an append point, of the sequential, log-based writing structure. For example, in certain embodiments, the snapshot module 150 may associate temporal ranges, spans, eras, periods, and/or epochs of data with an epoch identifier, and preserve the association when data is copied forward on the sequential, log-based writing structure or the like. The snapshot module 150 may associate an epoch identifier with each snapshot, allowing the snapshot module 150 to determine which data in the sequential, log-based writing structure is associated with the snapshot.

In one embodiment, the snapshot module 150 may comprise executable software code, such as a device driver, SML 130, or the like, stored on the computer readable storage media 114 for execution on the processor 111. In another embodiment the snapshot module 150 may comprise logic hardware of one or more of the non-volatile memory devices 120A-N, such as a non-volatile memory media controller 126A-N, a non-volatile memory controller 124, a device controller, a field-programmable gate array (FPGA) or other programmable logic, firmware for an FPGA or other programmable logic, microcode for execution on a microcontroller, an application-specific integrated circuit (ASIC), or the like. In a further embodiment, the snapshot module 150 may include a combination of both executable software code and logic hardware.

In one embodiment, the snapshot module 150 is configured to receive storage requests from the SML 130 via a bus 125 or the like. The snapshot module 150 may be further configured to transfer data to/from the SML 130 and/or storage clients 116 via the bus 125. Accordingly, the snapshot module 150, in some embodiments, may comprise and/or be in communication with one or more direct memory access (DMA) modules, remote DMA modules, bus controllers, bridges, buffers, and so on to facilitate the transfer of storage requests and associated data. In another embodiment, the snapshot module 150 may receive storage requests as an API call from a storage client 116, as an IO-CTL command, or the like. The snapshot module 150 is described in greater detail below with regard to FIGS. 3 and 4.

FIG. 1B is a block diagram of another embodiment of a system 101 comprising a snapshot module 150. As described above, the snapshot module 150 may be part of and/or in communication with a storage management layer 130. The SML 130 may operate on a non-volatile memory system 102 of a computing device 110, which, as discussed above, may comprise a processor 111, volatile memory 112, communication interface 113, and non-transitory, computer readable storage media 114. The communication interface 113 may comprise one or more network interfaces configured to communicatively couple the computing device 110 (and/or non-volatile memory controller 124) to a network 115 and/or to one or more remote, network-accessible storage clients 116.

The computing device 110 may comprise a non-volatile memory controller 124 that is configured to provide storage services to the storage clients 116. The storage clients 116 may include local storage clients 116 operating on the computing device 110 and/or remote, storage clients 116 accessible via the network 115 (and network interface 113). The non-volatile memory controller 124 comprises one or more non-volatile memory devices 120. Although FIG. 1B depicts a single non-volatile memory device 120, the disclosure is not limited in this regard and could be adapted to incorporate any number of non-volatile memory devices 120.

The non-volatile memory device 120 may comprise non-volatile memory media 122, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONO S), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like. While the non-volatile memory media 122 is referred to herein as "memory media," in various embodiments, the non-volatile memory media 122 may more generally comprise a non-volatile recording media capable of recording data, which may be referred to as a non-volatile memory media, a non-volatile storage media, or the like. Further, the non-volatile memory device 120, in various embodiments, may comprise a non-volatile recording device, a non-volatile memory device, a non-volatile storage device, or the like.

The non-volatile memory media 122 may comprise one or more non-volatile memory elements 123, which may include, but are not limited to: chips, packages, planes, die, and the like. A non-volatile memory media controller 126 may be configured to manage storage operations on the non-volatile memory media 122, and may comprise one or more processors, programmable processors (e.g., field-programmable gate arrays), or the like. In some embodiments, the non-volatile memory media controller 126 is configured to store data on (and read data from) the non-volatile memory media 122 in the contextual, log-based format (e.g., a sequential, log-based writing structure) described above, and to transfer data to/from the non-volatile memory device 120, and so on.

The non-volatile memory media controller 126 may be communicatively coupled to the non-volatile memory media 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. As discussed above, the logical memory element may be partitioned into respective logical memory units (e.g., logical pages) and/or logical memory divisions (e.g., logical erase blocks). The logical memory units may be formed by logically combining physical memory units of each of the non-volatile memory elements. For example, if the non-volatile memory media 122 comprises twenty-five (25) non-volatile memory elements, each logical memory unit may comprise twenty-five (25) pages (a page of each element of non-volatile memory media 122).

The non-volatile memory controller 124 may comprise a SML 130 and the non-volatile memory media controller 126. The SML 130 may provide storage services to the storage clients 116 via one or more interfaces 131, 132, and/or 133. In some embodiments, the SML 130 provides a block-device I/O interface 131 through which storage clients 116 perform block-level I/O operations. Alternatively, or in addition, the SML 130 may provide a storage management layer (SML) interface 132, which may provide other storage services to the storage clients 116. In some embodiments, the SML interface 132 may comprise extensions to the block device interface 131 (e.g., storage clients 116 may access the SML interface 132 through extensions to the block device interface 131). Alternatively, or in addition, the SML interface 132 may be provided as a separate API, service, and/or library. The SML 130 may be further configured to provide a cache interface 133 for caching data using the non-volatile memory system 102.

As described above, the SML 130 may present a logical address space 134 to the storage clients 116 (through the interfaces 131, 132, and/or 133). The SML 130 may maintain metadata 135 comprising any-to-any mappings between logical addresses in the logical address space 134 and media locations on the non-volatile memory device 120. The metadata 135 may comprise a logical-to-physical mapping structure with entries that map logical addresses in the logical address space 134 and media locations on the non-volatile memory device 120. The logical-to-physical mapping structure of the metadata 135, in one embodiment, is sparsely populated, with entries for logical addresses for which the non-volatile memory device 120 stores data and with no entries for logical addresses for which the non-volatile memory device 120 does not currently store data. The metadata 135, in certain embodiments, tracks data at a block level, with the SML 130 managing data as blocks. The SML 130 may write logical addresses to the non-volatile memory media 122 with the associated data to preserve logical-to-physical mappings in the sequential, log-based writing structure described below, to facilitate reconstruction of the logical-to-physical mapping structure in the case of an unexpected restart event, or the like.

The non-volatile memory system 102 may further comprise a log storage module 137, which, as described above, may be configured to store data on the non-volatile memory device 120 in a contextual, log-based format. The contextual, log-based data format may comprise associating data with a logical address on the non-volatile memory media 122. The contextual, log-based format may further comprise associating data with respective sequence identifiers on the non-volatile memory media 122, which define an ordered sequence of storage operations performed on the non-volatile memory media 122, as described above. The non-volatile memory controller 124 may further comprise a non-volatile memory device interface 139 that is configured to transfer data, commands, and/or queries to the non-volatile memory media controller 126 over a bus 125, as described above.

Figure 2:
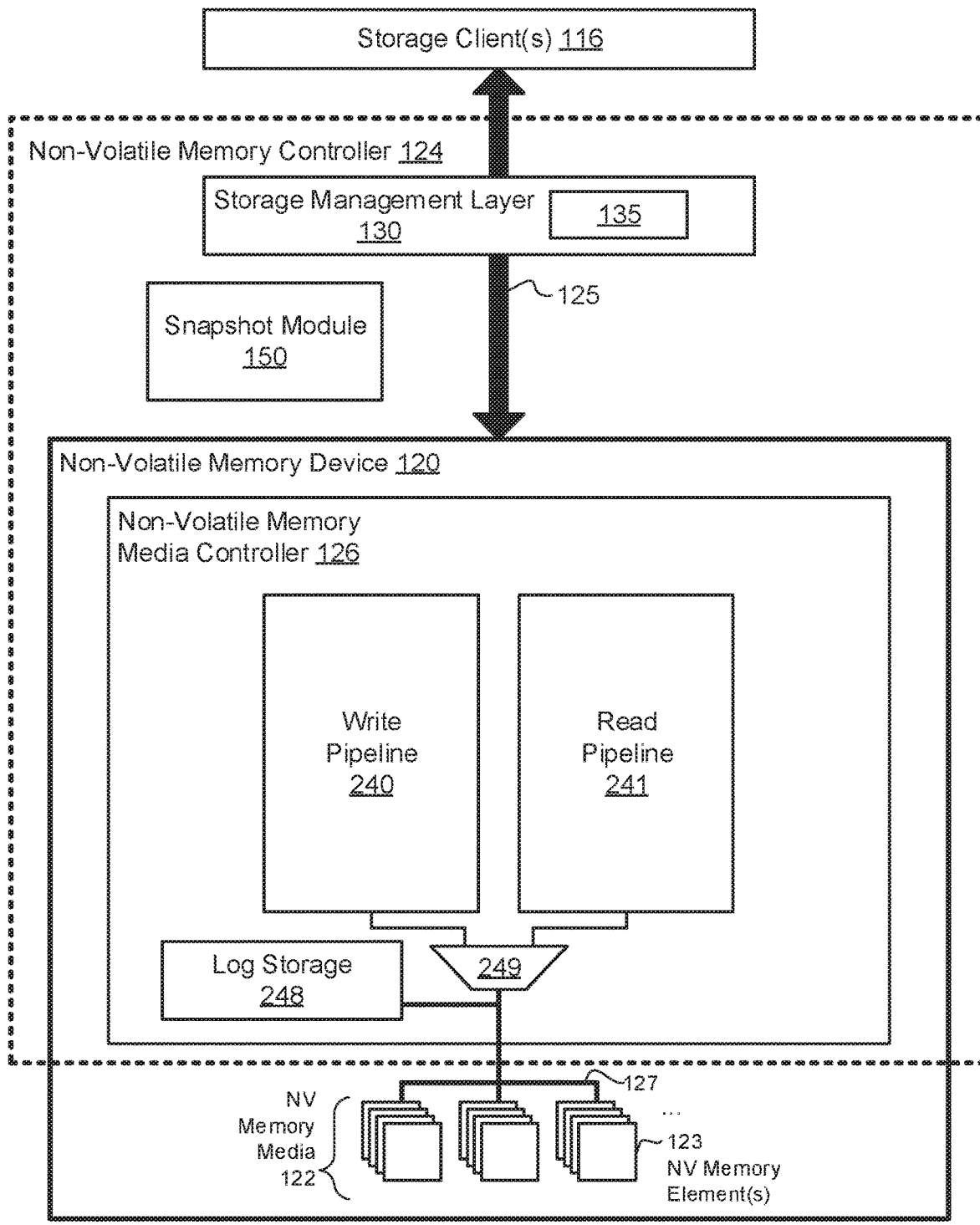
FIG. 2 is a schematic block diagram of another embodiment of a system for snapshots of data.

FIG. 2 depicts another embodiment of a non-volatile memory controller 124 for snapshots of data. The non-volatile memory device 120 may comprise a non-volatile memory media controller 126 and non-volatile memory media 122. The non-volatile memory media 122 may comprise a plurality of non-volatile memory elements 123, which may be communicatively coupled to the non-volatile memory media controller 126 via a bus 127, as described above.

The non-volatile memory media controller 126 may comprise a write pipeline 240 that is configured to store data on the non-volatile memory media 122 in a contextual format in response to requests received via the snapshot module 150. The requests may include and/or reference data to be stored on the non-volatile memory media 122, may include logical address(es) of the data, and so on. As described above, the contextual format may comprise storing a logical address of the data in association with the data on the non-volatile memory media 122. For example, the write pipeline 240 may be configured to format data into packets, and may include the logical address of the data in a packet header (or other packet field). The write pipeline 240 may be configured to buffer data for storage on the non-volatile memory media 122. In some embodiments, the write pipeline 240 may comprise one or more synchronization buffers to synchronize a clock domain of the non-volatile memory media controller 126 with a clock domain of the non-volatile memory media 122 (and/or bus 127).

The log storage module 248 may be configured to select media location(s) for the data and may provide addressing and/or control information to the non-volatile memory elements 123 via the bus 127. In some embodiments, the log storage module 248 is configured to store data sequentially in a log-based format within the non-volatile memory media. The log storage module 248 may be further configured to groom the non-volatile memory media, as described above. In certain embodiments the log storage module 248 is substantially similar to the log storage module 137 as described above. The log storage module 248 may be executed by the SML 130 and/or by the non-volatile memory media controller 126.

Upon writing data to the non-volatile memory media, the non-volatile memory media controller 126 may be configured to update metadata 135 (e.g., a forward index) to associate the logical address(es) of the data with the media address(es) of the data on the non-volatile memory media 122. In some embodiments, the metadata 135 may be maintained on the non-volatile memory media controller 126; for example, the metadata 135 may be stored on the non-volatile memory media 122, on a volatile memory (not shown), or the like. Alternatively, or in addition, the metadata 135 may be maintained within the SML 130 (e.g., on a volatile memory 112 of the computing device 110 of FIGS. 1A and 1B). In some embodiments, the metadata 135 may be maintained in a volatile memory by the SML 130, and may be periodically stored on the non-volatile memory media 122.

The non-volatile memory media controller 126 may further comprise a read pipeline 241 that is configured to read contextual data from the non-volatile memory media 122 in response to requests received via the request module 250. The requests may comprise a logical address of the requested data, a media address of the requested data, and so on. The read pipeline 241 may be configured to read data stored in a contextual format from the non-volatile memory media 122 and to provide the data to the SML 130 and/or a storage client 116. The read pipeline 241 may be configured to determine the media address of the data using a logical address of the data and the metadata 135. Alternatively, or in addition, the SML 130 may determine the media address of the data and may include the media address in the request. The log storage module 248 may provide the media address to the non-volatile memory elements 123, and the data may stream into the read pipeline 241 via a buffer. The read pipeline 241 may comprise one or more read synchronization buffers for clock domain synchronization, as described above.

The non-volatile memory media controller 126 may further comprise a multiplexer 249 that is configured to selectively route data and/or commands to/from the write pipeline 240 and the read pipeline 241. In some embodiments, non-volatile memory media controller 126 may be configured to read data while filling a buffer of the write pipeline 240 and/or may interleave one or more storage operations on one or more banks of non-volatile memory elements 123 (not shown).

Figure 3:
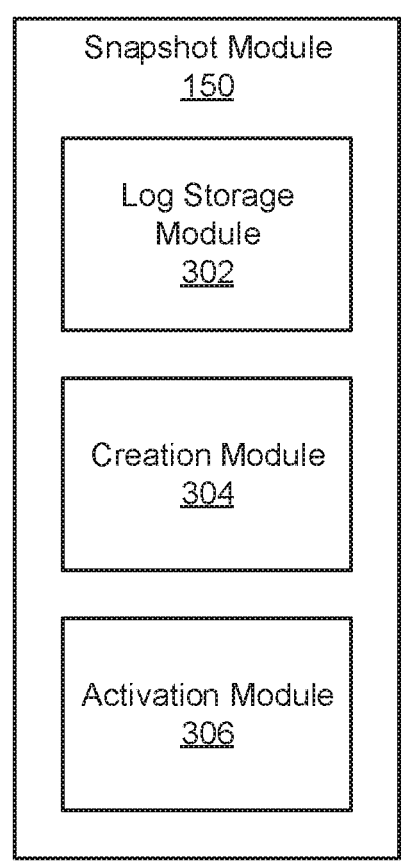
FIG. 3 is a schematic block diagram illustrating one embodiment of a snapshot module.

FIG. 3 depicts one embodiment of a snapshot module 150. The snapshot module 150 may be substantially similar to the snapshot module 150 described above with regard to FIGS. 1A, 1B, and 2. In general, as described above, the snapshot module 150 provides access to snapshots for data in a sequential, log-based writing structure, servicing snapshot requests for storage clients 116 or the like. In the depicted embodiment, the snapshot module 150 includes a log storage module 302, a creation module 304, and an activation module 306.

One or more of the log storage module 302, the creation module 304, and the activation module 306, in certain embodiments, may comprise executable code executing on the host computing device 110. For example, the log storage module 302, the creation module 304, and/or the activation module 306 may be part of a device driver for the non-volatile memory device 120, such as the SML 130, a layer above or below the SML 130, or the like. In a further embodiment, at least a portion of the log storage module 302, the creation module 304, and/or the activation module 306 may be part of the non-volatile memory media controller 126, as hardware logic circuits, FPGA firmware, microcode, or the like.

In one embodiment, the log storage module 302 stores data in a sequential, log-based writing structure. As described above, a sequential, log-based writing structure may comprise a sequential log, a journal, a chronologically ordered writing structure, or the like. The log storage module 302, in certain embodiments, may be substantially similar to the log storage module 137 of FIGS. 1A and 1B and/or the log storage module 248 of FIG. 2. As described above, the log storage module 302 may sequentially write data to an append point of a sequential, log-based writing structure preserved in the non-volatile memory media 122. The log storage module 302 may write data to the sequential, log-based writing structure in a temporal order in which the data is received from storage clients 116, in association with write requests, or the like.

In one embodiment, the log storage module 302 stores a logical identifier or range of logical identifiers for data, such as an LBA, an LBA range, or the like, with the data in the sequential, log-based writing structure of the non-volatile memory device 120. For example, the log storage module 302 may store a logical identifier, a range of logical identifiers, or the like in a metadata header for a data segment, such as a data packet, an error correcting code (ECC) chunk or block, a logical page, a physical page, a logical erase block, a physical erase block, an LBA data block/sector or range of data blocks/sectors, a file, a data object, or another predefined segment of data. Storing one or more logical identifiers with data in the sequential, log-based writing structure to preserve logical-to-physical mappings, in certain embodiments, allows the activation module 306 and/or the reconstruction module 416 to build or reconstruct logical-to-physical address mappings for the data by scanning the log-based writing structure and mapping the stored logical identifiers to the physical locations of the stored data.

The log storage module 302, in certain embodiments, may write data sequentially within storage regions of the non-volatile memory media 122, such as logical or physical erase blocks, logical or physical pages, chips, dies, die planes, and/or other storage regions. In embodiments where the storage regions do not have a natural or predetermined order or sequence, the log storage module 302 may determine a sequentially ordered list of storage regions to maintain or track the order in which the storage regions are used in the sequential, log-based writing structure, thereby preserving the temporal order of data across different storage regions. One example of a sequential, log-based writing structure comprising an ordered set of erase blocks is described below with regard to FIG. 5.

While the log storage module 302 writes data sequentially to a sequential, log-based writing structure, in certain embodiments, maintenance operations, such as a storage capacity recovery operation or the like, may interfere with the sequential order, causing certain data to become out of order. In one embodiment, the temporal order module 402 described below with regard to FIG. 4 preserves a temporal order of the data in the sequential, log-based writing structure, even in the presence of interfering maintenance operations or the like. One embodiment of a storage capacity recovery module 414 is described below with regard to FIG. 4. In general, the storage capacity recovery module 414 recovers storage capacity of the sequential, log-based writing structure by copying or otherwise writing certain data from a selected storage region (e.g., a logical or physical erase block) forward to an append point of the sequential, log-based writing structure (e.g., a new or different storage region) to preserve the data and erasing the selected storage region so that the selected storage region may be reused to store different data.

In one embodiment, the creation module 304 is configured to create or initialize a snapshot for data stored in the sequential, log-based writing structure of the non-volatile memory media 122. The creation module 304 may create or initialize a snapshot in response to a creation event for the snapshot. A creation event, as used herein, comprises a trigger or other detectable occurrence which may indicate to the creation module 304 to create or initialize a snapshot. A creation event, in one embodiment, may include a snapshot creation request from a storage client 116 as described below with regard to the snapshot interface module 404. In another embodiment, a creation event may include a periodic timer (e.g., a predefined period of time having passed since a previous snapshot, a previous creation event, or the like). In other embodiments, a creation event may include a predefined error, a predefined operation, transaction, or request for the non-volatile memory device 120, or the like.

The creation module 304, in certain embodiments, may perform a minimum operation to initialize or create a snapshot (e.g., ensuring that data of the snapshot, associated logical-to-physical mappings, validity metadata, or the like are preserved in the sequential, log-based writing structure) while other operations (e.g., determining logical-to-physical mappings for the snapshot, determining validity metadata for the snapshot) are deferred until an activation event that occurs later in time. Deferring certain operations may allow the creation module 304 to initialize or create snapshots very quickly, with little or no impact on other storage operations for the non-volatile memory device 120. The creation module 304, in certain embodiments, may initialize or create a snapshot without copying or moving data of the snapshot, because the data is stored sequentially in the sequential, log-based writing structure, which may preserve the data instead of overwriting it in response to a subsequent write request for the data.

In one embodiment, the creation module 304 initializes or creates a snapshot at a point in time of the associated creation event, such as a point in time at which a snapshot creation request is received by the snapshot interface module 404 described below. In certain embodiments, the creation module 304 may temporarily quiesce, hold, stop, pause, stall, halt, and/or delay storage operations for the non-volatile memory device 120 and may flush data of pending storage requests received prior to a snapshot creation event to the non-volatile memory device (through the write pipeline 240 or the like) so that the snapshot is consistent and the pending or in-flight data is included in the snapshot.

The creation module 304, to initialize or create a snapshot, may mark a point for the snapshot in the sequential, log-based writing structure. The creation module 304 may mark a point in the sequential, log-based writing structure by writing a snapshot-create indicator, note, or message to the log. A snapshot-create indicator, in one embodiment, identifies a snapshot. A snapshot-create indicator may include a snapshot identifier such as a snapshot name or number, an epoch identifier as described below with regard to the temporal order module 402, or the like. In a further embodiment, the creation module 304 may mark a point for a snapshot in a separate data structure, tracking snapshot locations in the sequential, log-based writing structure, such as the snapshot data structure described below with regard to the snapshot tracking module 408.

By writing a snapshot-create indicator, note, or message to the sequential, log-based writing structure, the creation module 304 may make the initialization or creation of the snapshot persistent, as the activation module 306 and/or the reconstruction module 416 may discover and process the snapshot-create indicator during a scan of the sequential, log-based writing structure as described below. Since a snapshot-create indicator may be relatively small in size, much smaller than the snapshot it represents, the creation module 304 may be configured to initialize or create snapshots very quickly, up to many times a second or the like.

In embodiments where a snapshot-create indicator comprises an epoch identifier, by initializing or creating a snapshot, the creation module 304, in cooperation with the temporal order module 402 or the like, may create a new epoch, with data prior to the snapshot-create indicator belonging to a previous epoch, and data after the snapshot-create indicator belonging to a next, incremented epoch. As described below, an epoch identifier may be written to the sequential, log-based writing structure as a marker dividing epochs and/or may be included in metadata for a data segment, such as a packet header or the like, identifying data of an epoch. Accordingly, the creation module 304 may use an epoch identifier to mark a point in the sequential, log-based writing structure by writing the epoch identifier to the sequential, log-based writing structure, by storing the epoch identifier in one or more metadata headers for data written in the sequential, log-based writing structure after the marked point in the sequential, log-based writing structure, or the like. In one embodiment, the creation module 304 and/or the temporal order module 402 may increment an epoch identifier prior to marking the point for the snapshot in the sequential, log-based writing structure. In another embodiment, the creation module 304 and/or the temporal order module 402 may increment an epoch identifier after marking the point in the sequential, log-based writing structure.

The creation module 304, in one embodiment, to initialize or create a snapshot, adds the snapshot to a snapshot data structure, as described below with regard to the snapshot tracking module 408, to track dependencies between snapshots or the like. Once the creation module 304 has initialized or created a snapshot, the creation module 304 may allow storage operations to proceed for the non-volatile memory device 120.

In one embodiment, the activation module 306 is configured to activate a snapshot that the creation module 304 has previously initialized or created, so that storage clients 116 may access the snapshot (e.g., a state of the data of the non-volatile memory device 120 at the point in time at which the snapshot was created). The activation module 306, in certain embodiments, activates a snapshot in response to an activation event for the snapshot. An activation event, as used herein, comprises a trigger or other detectable occurrence which may indicate to the activation module 306 to activate or provide access to a snapshot.

An activation event, in one embodiment, may include a snapshot activation request from a storage client 116 as described below with regard to the snapshot interface module 404. In another embodiment, an activation event may include a periodic timer (e.g., a predefined period of time having passed since a previous snapshot activation event, or the like). In other embodiments, an activation event may include a predefined error, a predefined operation, transaction, or request for the non-volatile memory device 120, or the like. In one embodiment, an activation event for a snapshot comprises a background activation process for the activation module 306 processing the snapshot (e.g., without an activation request for the snapshot). In another embodiment, an activation event may be scheduled for a snapshot (e.g., a scheduled activation event), to occur at a scheduled time, in response to a scheduled event, or the like. In a further embodiment, an activation event may comprise a predefined failure event. For example, in response to a transaction failing, in certain embodiments, the activation module 306 may activate a snapshot of data from prior to the transaction, or the like, thereby rolling back the transaction.

Activating a snapshot, as used herein, comprises preparing the snapshot and/or related metadata or data structures, so that the snapshot is ready for access. As described above, in certain embodiments, activation of a snapshot may be delayed and separated from creation or initialization of the snapshot, so that the creation module 304 may create or initialize snapshots quickly and efficiently. Activating a snapshot, in one embodiment, is a longer, more resource intensive operation than creating or initializing a snapshot.

In certain embodiments, a storage client 116 may not access a snapshot until the activation module 306 activates the snapshot. For example, the snapshot module 150, the SML 130, or the like may not maintain a logical-to-physical mapping structure for a snapshot until the activation module 306 activates the snapshot. In order to provide access to a snapshot, in one embodiment, the activation module 306 determines logical-to-physical address mappings corresponding to the snapshot. Maintaining multiple logical-to-physical address mapping structures for different snapshots in volatile host memory 112 or the like may be resource intensive, requiring large portions of memory 112, requiring multiple updates to different mapping structures as data is moved, or the like. Additionally, storage clients 116 may activate snapshots to restore lost or corrupted data, which may be a rare event. For these reasons, in certain embodiments, the activation module 306 determines logical-to-physical address mappings for a snapshot in response to an activation event, after and later than a creation event for the snapshot. In other embodiments, the activation module 306 may maintain multiple logical-to-physical address mapping structures in host volatile memory 112, in the non-volatile memory device 120, or the like.

The activation module 306 may determine logical-to-physical address mappings for a snapshot by scanning or processing at least a portion of the sequential, log-based writing structure and populating a logical-to-physical address mapping structure for the snapshot. As described above with regard to the log storage module 302, in certain embodiments, the log-storage module 302 stores logical identifiers for data with the data in the sequential, log-based writing structure. The activation module 306 may determine a logical-to-physical address mapping may mapping a stored logical identifier for data to the physical location of the non-volatile memory device 120 that stores the data.

The activation module 306, in certain embodiments, scans or processes at least a portion of the sequential, log-based writing structure in a sequential, chronological, or temporal order (e.g., from newer data toward older data, from older data toward newer data, or the like). For example, in embodiments where the temporal order module 402 maintains or preserves a temporal order using epoch identifiers, the activation module 306 may scan or process data of the sequential, log-based writing structure starting from an epoch for the snapshot toward older data of the log, may start from an oldest epoch toward an epoch for the snapshot, or the like. In embodiments where the snapshot tracking module 408 maintains dependency relationships for different snapshots, in a snapshot data structure or the like, the activation module 306 may cooperate with the snapshot tracking module 408 to scan or process only the epochs or temporal ranges in the sequential, log-based writing structure on which the activated snapshot depends, which may be more efficient than scanning or processing the entire sequential, log-based writing structure.

If the activation module 306 encounters multiple entries for the same logical identifier, the activation module 306 may use the most recent data, prior to the point in time of the snapshot, for the logical-to-physical mappings, as that data would have invalidated the older data. In a further embodiment, the activation module 306 may cooperate with the validity module 406 described below to determine which data is valid for a specific snapshot. In one embodiment, the activation module 306 may determine validity metadata (e.g., a validity map) for an activated snapshot, as described below with regard to the validation module 406. In one embodiment, the validity module 406 may maintain validity metadata in volatile memory 112, in the non-volatile memory media 126, or the like for a plurality of snapshots. In another embodiment, the validity module 406 and/or the activation module 306 may scan or process the sequential, log-based writing structure to create validity metadata for a snapshot in response to an activation event, marking the newest or most recent version of data for each logical identifier prior to the point-in-time of the snapshot as valid and older versions as invalid.

In one embodiment, prior to activating a snapshot, the activation module 306 may validate existence of the snapshot, cooperating with the snapshot tracking module 408 or the like to determine whether or not the snapshot exists. In a further embodiment, the activation module 306 may write a snapshot-activate indicator, note, or message for a snapshot to the sequential, log-based writing structure in response to an activation event for the snapshot, allowing the reconstruction module 416 to determine which snapshot or state of data was active in response to a power loss or other restart event as described below. A snapshot-activate indicator, message, or note may identify an activated snapshot. For example, a snapshot-activate indicator may include a snapshot identifier such as a snapshot name or number, an epoch identifier, or the like.

In one embodiment, the activation module 306 and/or the temporal order module 402 may increment an epoch identifier in response to activating a snapshot. An active snapshot, in certain embodiments, may be read from, written to, or otherwise modified, and subsequent snapshots may depend on the active snapshot rather than or in addition to a previously activated snapshot. For this reason, in certain embodiments, the activation module 306 may cooperate with the snapshot tracking module 408 to create a fork or split in a snapshot data structure such as a snapshot tree in response to activating a snapshot, so that subsequent snapshots created while the snapshot is active will depend on the active snapshot.

Figure 4:
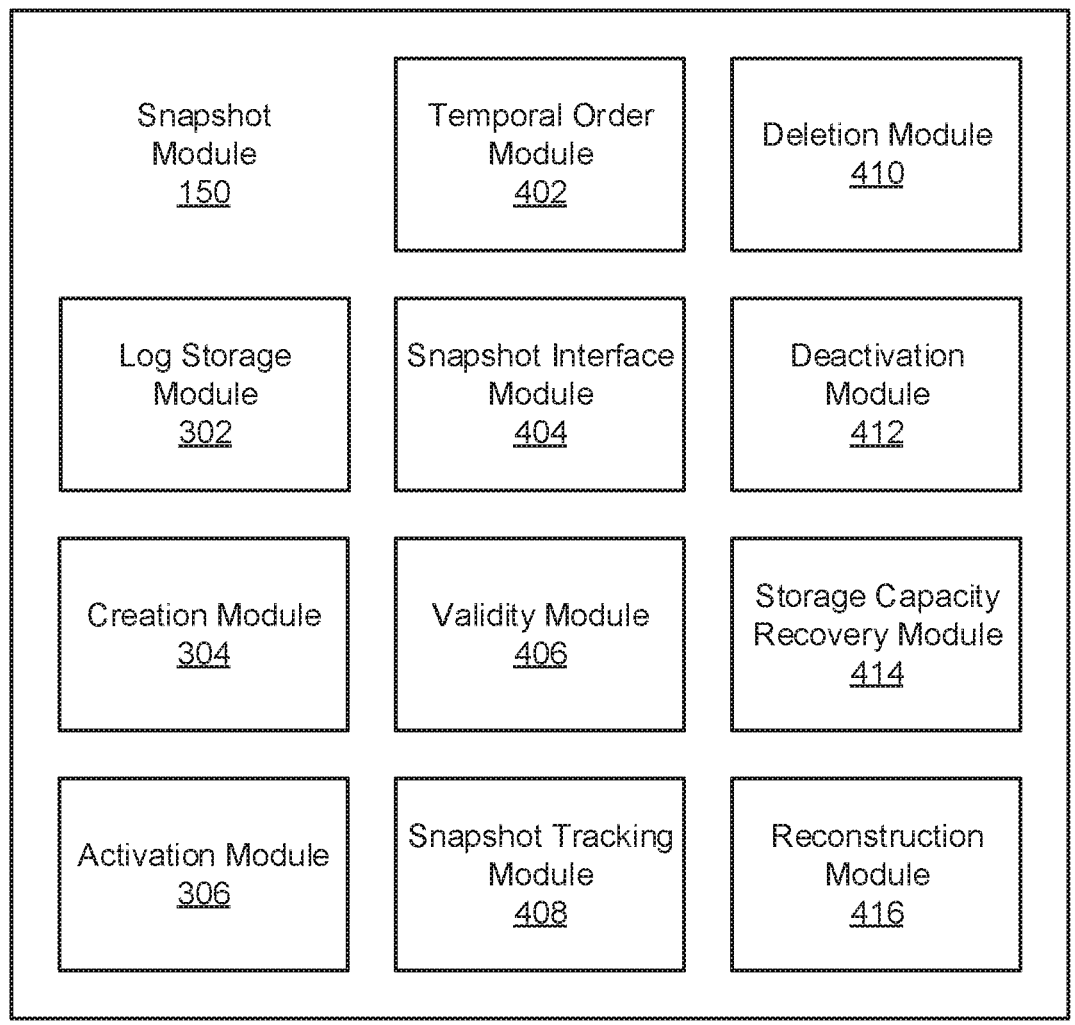
FIG. 4 is a schematic block diagram illustrating another embodiment of a snapshot module.

FIG. 4 depicts another embodiment of the snapshot module 150. The snapshot module 150 may be substantially similar to the snapshot module 150 described above with regard to FIGS. 1A, 1B, 2, and 3. In the depicted embodiment, the snapshot module 150 includes a log storage module 302, a creation module 304, and an activation module 306 substantially as described above and further includes a temporal order module 402, a snapshot interface module 404, a validity module 406, a snapshot tracking module 408, a deletion module 410, a deactivation module 412, a storage capacity recovery module 414, and a reconstruction module 416.

One or more of the log storage module 302, the creation module 304, the activation module 306, the temporal order module 402, the snapshot interface module 404, the validity module 406, the snapshot tracking module 408, the deletion module 410, the deactivation module 412, the storage capacity recovery module 414, and the reconstruction module 416, in certain embodiments, may comprise executable code executing on the host computing device 110, such as part of a device driver for the non-volatile memory device 120, part of the SML 130, a layer above or below the SML 130, or the like. In a further embodiment, at least a portion of the log storage module 302, the creation module 304, the activation module 306, the temporal order module 402, the snapshot interface module 404, the validity module 406, the snapshot tracking module 408, the deletion module 410, the deactivation module 412, the storage capacity recovery module 414, and/or the reconstruction module 416 may be part of the non-volatile memory media controller 126, as hardware logic circuits, FPGA firmware, microcode, or the like.

The temporal order module 402, in certain embodiments, marks or labels data in the sequential, log-based writing structure with sequence information, such as an epoch identifier, a span identifier, an era identifier, or the like that indicates a temporal and/or chronological order for data, even if the data is copied forward to an append point or other new location in the sequential, log-based writing structure. An epoch identifier, as used herein, comprises an indicator, marker, label, flag, field, packet, or other data structure or value identifying or preserving a temporal and/or sequential order for data in a sequential, log-based writing structure.

An epoch identifier may be absolute (e.g., a timestamp), relative (e.g., a sequence number), or may otherwise indicate a temporal and/or sequential order for data. The temporal order module 402, in one embodiment, may insert an epoch identifier into individual data segments, such as packets, ECC chunks or blocks, logical pages, physical pages, logical erase blocks, physical erase blocks, LBA data block or range of data blocks, files, data objects, or another predefined segment of data. For example, in one embodiment, the write pipeline 240 may packetize data into discrete data packets and each data packet may include a metadata header, into which the temporal order module 402 may insert an epoch identifier for the data packet as the write pipeline 240 and/or the log storage module 302 processes the data packets and writes them to the sequential, log-based writing structure.

The temporal order module 402, in one embodiment, may use a different epoch identifier for different data segments, incrementing the epoch identifiers between data segments or the like. In a further embodiment, the temporal order module 402 may mark or label a plurality of data segments with the same epoch identifier. For example, the temporal order module 402 may associate a temporal range, span, era, period, and/or epoch of data (e.g., data received and/or written within the same period of time) with a single epoch identifier. The temporal order module 402, in one embodiment, may insert copies of the single epoch identifier into metadata for each data segment associated with the temporal range. For example, the temporal order module 402 may store an epoch identifier in metadata packet headers for packets in the temporal range associated with the epoch identifier.

In another embodiment, the temporal order module 402 may mark or label an entire temporal range of data with an epoch identifier, without storing copies of the epoch identifier with each individual data segment within the temporal range. For example, the temporal order module 402 may store an epoch identifier at a beginning, end, and/or another predefined location within a temporal range of data. In one embodiment, the temporal order module 402 may store an epoch identifier or marker at the beginning of each new temporal range of data or epoch, so that the data between epoch identifiers is associated with the beginning epoch identifier. The temporal order module 402, in certain embodiments, may mark both the beginning and the end of a temporal range with the same epoch identifier. In a further embodiment, the temporal order module 402 may use a beginning epoch identifier of a next temporal range as an end marker for a previous temporal range, or the like.

The temporal order module 402, in one embodiment, marks a temporal range with an epoch identifier in a dedicated epoch metadata packet or the like, writing an epoch metadata packet to an append point of the sequential, log-based writing structure at the beginning and/or ending of a temporal range of data. In a further embodiment, the temporal order module 402 may insert a beginning and/or ending epoch identifier into metadata for a data segment, such as a metadata header or the like, associated with workload data of a storage client 116, or the like, without a dedicated epoch metadata packet. For example, the temporal order module 402 may store an epoch identifier in a packet header at the beginning of a temporal range, a packet header at the end of a temporal range, or the like. In certain embodiments, using an epoch identifier to mark the beginning and/or end of a temporal range may be more efficient than marking each data segment in the temporal range with an epoch identifier.

The temporal order module 402, in certain embodiments, increments an epoch identifier for association with each subsequent temporal range of data in the sequential, log-based writing structure. For example, the temporal order module 402, in one embodiment, may increment an epoch identifier in response to a new epoch request from a storage client 116, and may mark a subsequent temporal range of data with the incremented epoch identifier. In other embodiments, the temporal order module 402 may increment an epoch identifier automatically and/or periodically in response to a predetermined amount of time elapsing (e.g., a timer), a storage request, a write request invalidating data, and/or another epoch trigger. Incrementing an epoch identifier, in various embodiments, may comprise updating the epoch identifier to a current timestamp, adding a predetermined value to the epoch identifier, performing a predetermined transform on the epoch identifier, or otherwise changing a value of a current epoch identifier for use as a subsequent epoch identifier. In certain embodiments, each epoch identifier may be unique. In a further embodiment, the temporal order module 402 may reuse an epoch identifier in response to expiring a temporal range or epoch associated with the epoch identifier, so that a set of currently used epoch identifiers remains unique.

The temporal order module 402, in one embodiment, preserves a temporal and/or sequential order of data across a maintenance operation, such as a storage capacity recovery event, which copies, moves, or otherwise changes an order of data in a sequential, log-based writing structure, by ensuring that temporal ranges of data remain associated with their respective epoch identifiers. In certain embodiments, the temporal order module 402 may copy one or more epoch identifiers forward to an append point of a sequential, log-based writing structure as part of a storage capacity recovery event or the like, so that the associated data remains associated with the epoch identifiers in the sequential, log-based writing structure. By preserving a temporal, sequential, and/or chronological order of data, in certain embodiment, the temporal order module 402 may thereby preserve a series of one or more snapshots or clones of data at different points in time, as described below with regard to the snapshot interface module 404.

For example, if the temporal order module 402 stores epoch identifiers in metadata headers of data packets, the temporal order module 402 may ensure that the epoch identifiers remain in the metadata headers as the data packets are copied or written forward on the sequential, log-based writing structure. In a further embodiment, the temporal order module 402 may copy or write data forward an entire temporal range of data at a time, so that the temporal range of data remains co-located in the sequential, log-based writing structure. For example, the temporal order module 402 may copy a beginning and/or end epoch identifier forward on the sequential, log-based writing structure together with the temporal range of data.

The temporal order module 402, in certain embodiments, is configured to increment an epoch identifier (e.g., start a new epoch) in response to a snapshot operation, such as a snapshot create operation, a snapshot delete operation, a snapshot activate operation, a snapshot deactivate operation, or the like. Creating separate epochs or temporal ranges for different snapshots, different snapshot operations, or the like may assist the activation module 306 in determining logical-to-physical address mappings for a snapshot and/or validity metadata for a snapshot, may assist the snapshot tracking module 408 in determining dependency relationships for different snapshots, or the like.

By incrementing an epoch identifier when snapshots are created, activated, or the like, in certain embodiments, the temporal order module 402 ensures that every snapshot is associated with an epoch identifier, which indicates the epoch or temporal range of data which was written to the sequential, log-based writing structure after the last known snapshot operation and before the snapshot-create operation was initiated for the associated snapshot. While each snapshot may have an epoch identifier associated with it, in certain embodiments, each epoch identifier may not necessarily have an associates snapshot. For example, the active logical-to-physical mapping structure for the non-volatile memory device 120 tree and each other activated snapshot may have unique epoch identifiers, which may not be associated with a new snapshot until one is created.

The temporal order module 402, in certain embodiments, may ensure that temporal ranges or epochs remain separate, by cooperating with the storage capacity recovery module 414 to copy or write data of a temporal range forward to a separate append point of the sequential, log-based writing structure than an intake append point. For example, as data is received from storage clients 116, the log storage module 302 may write the data to an intake append point of a sequential, log-based writing structure and the storage capacity recovery module 414 may copy or write data forward to a separate append point of the sequential, log-based writing structure during a storage capacity recovery operation, so that the data does not become mixed, and temporal ranges of data remain together. Different append points of a sequential, log-based writing structure may comprise separate write pipelines 240, separate buffers or queues, separate logs within the log-based writing structure, or the like such that data written to the different append points is separated, allowing different temporal ranges or epochs to remain together.

In another embodiment, the temporal order module 402 may allow a temporal range of data or epoch to become separated or disjoint within a sequential, log-based writing structure, while preserving the temporal and/or sequential order of the data using epoch identifiers or the like. The temporal order module 402, in certain embodiments, may scan the sequential, log-based writing structure to locate epoch identifiers associating data with a temporal range or epoch.

In a further embodiment, the temporal order module 402 may maintain one or more data structures mapping or tracking locations of data for temporal ranges or epochs of data. For example, in one embodiment, the temporal order module 402 may maintain a logical-to-physical mapping structure for each temporal range or epoch, mapping logical addresses of a temporal range or epoch to the physical locations of the data in the sequential, log-based writing structure of the non-volatile memory media 122. In a further embodiment, where temporal ranges or epochs are contiguous within a sequential, log-based writing structure, the temporal order module 402 may maintain a single logical-to-physical mapping structure that maps epoch identifiers to the contiguous location of the associated temporal ranges or epochs in the non-volatile memory media 122.

In embodiments where the temporal order module 402 maintains or preserves one or more mapping structures for temporal ranges or epochs, the temporal order module 402 may rebuild or reconstruct a lost or damaged mapping structure by scanning the sequential, log-based writing structure to locate epoch identifiers, and may create mappings between the epoch identifiers (or associated logical addresses) and the physical locations in the non-volatile memory media 122. Reconstructing mappings for temporal ranges of data or epochs is described in greater detail below with regard to the reconstruction module 416 of FIG. 4. Because the temporal and/or sequential order of data is preserved in the sequential, log-based writing structure, the temporal order module 402, in certain embodiments, may reconstruct temporal metadata or mappings based on data stored in the sequential, log-based writing structure should the non-volatile memory device 120 experience a power failure or other restart event, thereby ensuring that the temporal and/or sequential order of data is persistent.

In one embodiment, data from a previous temporal range may be invalidated by new or updated data written to the same logical address or logical address range as the data. In certain embodiments, the temporal order module 402 may preserve invalid data so that the invalid data is not erased during a storage capacity recovery operation and so that the snapshot interface module 404 may provide access to the previous temporal range of data even after some or all of the data has been invalidated. The temporal order module 402, in one embodiment, retains or preserves each version of data in a temporal range or epoch, as different snapshots, clones, or the like, so that multiple versions, snapshots, and/or clones of data for the same logical address are retained and are accessible in the same temporal range or epoch. For example, if a storage client 116 writes one version of a file to the non-volatile memory device 120 and writes a different version of the file within the same temporal range or epoch (e.g., before the temporal order module 402 has incremented an epoch identifier), the temporal order module 402 may retain both versions of the file, so that the snapshot interface module 404 may provide the storage client 116 with access to both versions.

In a further embodiment, instead of retaining or preserving multiple versions, snapshots, and/or clones of the same data within the same temporal range or epoch, the temporal order module 402 may retain a single version, snapshot, and/or clone, such as a most recent version of data, an oldest version of data, or the like, for each temporal range or epoch, and allow older, invalid versions of data in each temporal range to be erased during a storage capacity recovery operation or the like. For example, the temporal order module 402 may cooperate with the storage capacity recovery module 414 to copy a most recent version of data, or another version, in a temporal range or epoch forward on a sequential, log-based writing structure, while allowing the storage capacity recovery module 414 to erase, delete, trim, or otherwise clear older versions of the data from the non-volatile memory device 120 during a storage capacity recovery operation.

In embodiments where the temporal order module 402 retains just a subset of one or more versions, snapshots, or clones of data, such as a most recent version of data or the like, for each temporal range or epoch, the snapshot interface module 404 may provide a storage client 116 with access to one or more versions, views, clones, or snapshots of data from a temporal range, without the overhead of storing multiple versions of data for each temporal range. The number of changes or versions of data that the temporal order module 402 retains per temporal range or epoch of data may vary on a per temporal range basis. For example, in one embodiment, the number of retained changes or versions may be selected by a storage client 116 in a new epoch request or the like. In another embodiment, the temporal order module 402 may store all changes or operations for a most recent set of one or more temporal ranges or epochs, and may retain just a most recent version of data for temporal ranges or epochs older than the most recent set.

In order for the snapshot interface module 404 to provide access to different versions, snapshots, and/or clones of data, as described below, in certain embodiments, the temporal order module 402 may be configured to preserve one or more validity maps, logical-to-physical mapping structures, or the like for different versions, snapshots, and/or clones of data. A validity bitmap, or other validity data structure, in certain embodiments, indicates the validity of a block or other data segment with respect to the non-volatile memory device 120. In embodiments with multiple versions, snapshots, epochs, and/or clones of data, a block or segment of data that is valid with respect to one snapshot may have been overwritten and may be invalid with respect to another snapshot.

The temporal order module 402, in certain embodiments, may maintain validity metadata, such as validity bitmaps or the like, for one or more different epochs, snapshots, clones, or the like of data. For a temporal range of data written during the course of an epoch, the non-volatile memory controller 124, the non-volatile memory media controller 126, the SML 130, or the like may modify and maintain validity metadata, logical-to-physical mappings, or other metadata as part of the metadata 135 as described above. In response to initializing or creating a new epoch, snapshot, clone or the like, in one embodiment, a state of the validity bitmap or other validity metadata may correspond to a current state of the non-volatile memory device 120 and the temporal order module 402 may preserve the validity bitmap or other validity metadata, such that the snapshot interface module 404 may determine which data is valid in the previous epoch, snapshot, clone, or the like.

The temporal order module 402 may modify a validity bitmap or other validity metadata and/or a logical-to-physical mapping structure for an epoch, snapshot, clone or the like in response to the storage capacity recovery module 414 moving or copying data as part of a storage capacity recovery operation, in response to a write request modifying data of an epoch, snapshot, or clone, or in response to another data update event. The non-volatile memory controller 124, the non-volatile memory media controller 126, the SML 130, or the like, in one embodiment, may cause a new epoch, snapshot, or clone to inherit the validity bitmap or other validity metadata and/or a logical-to-physical mapping from a previous epoch, snapshot, or clone. The non-volatile memory controller 124, the non-volatile memory media controller 126, the SML 130 or the like may modify and update the inherited validity bitmap or other validity metadata and/or a logical-to-physical mapping structure for the new epoch, snapshot, or clone in response to write requests invalidating previous data, storage capacity recovery operations, or the like.

In one embodiment, the temporal order module 402 copies a validity bitmap or other validity metadata and/or a logical-to-physical mapping structure for an epoch, snapshot, or clone at creation time of the epoch, snapshot, or clone. In a further embodiment, instead of copying an entire validity bitmap or other validity metadata and/or logical-to-physical mapping structure at creation time, the temporal order module 402 may maintain the changes, deltas, or differences between chronologically adjacent epochs, snapshots, and/or clones, or may otherwise maintain partial validity metadata and/or logical-to-physical mappings (e.g., copy-on-write validity bitmaps, as described below). In one embodiment, the temporal order module 402 may rely on or use a sequential order of data in the sequential, log-based writing structure to maintain a temporal, chronological, and/or sequential order of data until data is moved by a storage capacity recovery operation of the storage capacity recovery module 414 or the like, as data belonging to the same epoch, snapshot, or clone may be contiguous and/or collocated prior to the storage capacity recovery operation. The temporal order module 402 may copy one or more validity bitmap entries or other validity metadata and/or logical-to-physical mappings for data of a snapshot, epoch, or clone opportunistically, automatically, and/or on-demand in response to data being copied, moved, or otherwise becoming out of order, a policy referred to herein as a copy-on-write policy.

The temporal order module 402, in various embodiments, may mark validity metadata and/or logical-to-physical mappings for certain data (e.g., logical blocks or sectors, logical or physical pages, ECC chunks, or the like) associated with a snapshot, epoch, or clone as copy-on-write, may mark all data as copy-on-write, or the like. In response to an attempt to modify validity metadata and/or a logical-to-physical mapping marked copy-on-write, the temporal order module 402 may create a copy and link the copy to the snapshot, epoch, or clone associated with the copy. In one embodiment, the validity metadata or validity bitmap and/or logical-to-physical mappings that the temporal order module 402 copies may be read-only (until reclamation or the like) and may be destaged to the sequential, log-based writing structure of the non-volatile memory device 120, or the like. In this manner, in certain embodiments, the temporal order module 402 may maintain validity metadata (e.g., validity bitmaps) and/or logical-to-physical mappings, or at least a portion thereof, for each epoch, each snapshot, or the like.

In certain embodiments, the temporal order module 402 may use a copy-on-write policy, substantially as described above, to maintain multiple snapshots for one or more epochs or other temporal ranges of data. In response to a write request updating or changing existing data stored in the non-volatile memory device 120, the temporal order module 402 may store just the changes or deltas to the data to an append point of the sequential, log-based writing structure. Storing just the changes or deltas to data, in one embodiment, may efficiently use storage capacity of the non-volatile memory media 122, limiting the amount of redundant data stored in the non-volatile memory device 120. The snapshot interface module 404, in response to a snapshot request as described below, may combine deltas, changes, and/or original data from multiple points in time (e.g., one or more epochs or other temporal ranges) to construct a snapshot in a copy-on-write environment.

In one embodiment, the snapshot interface module 404 receives, services, executes, fulfills, and/or otherwise satisfies snapshot requests from storage clients 116, using the temporal and/or sequential order of data preserved in the sequential, log-based writing structure by the temporal order module 402. A snapshot request, as used herein, comprises a command, function call, message, or other request associated with or which may be satisfied using a snapshot of data. A snapshot request, in various embodiments, may include a snapshot create request, a snapshot delete request, a snapshot activate request, a snapshot deactivate request, a snapshot delete request, or the like as described below. The snapshot interface module 404, in various embodiments, may directly or indirectly receive a snapshot request over an API, using a shared library, over a block I/O interface 131, over an SML interface 132, over another interface, from another module or device, and/or in another manner.

The snapshot interface module 404, in one embodiment, services a snapshot request by providing a snapshot of data from a different point in time to the requesting storage client 116 based on the preserved temporal order of data in the sequential, log-based writing structure. A snapshot, as described above, comprises a representation of data in the non-volatile memory device 120, or a portion thereof, at a particular point in time. Storage clients 116 may use a snapshot as a backup, as an audit trail for regulatory compliance or the like, for asynchronous replication of data at a separate location, to isolate operations to a copy of data rendering the operation transactional, or the like. A snapshot, in one embodiment, comprises a block-level snapshot of logical blocks or sectors of the non-volatile memory device 120, accessible using LBAs or other logical addresses of the logical address space 134. In a further embodiment, a snapshot may comprise a file-system-level snapshot accessible with file names or other logical identifiers.

The snapshot interface module 404, in certain embodiments, may cooperate with the creation module 304 to service snapshot create requests, the activation module 306 to service snapshot activate requests, the deletion module 410 to service snapshot delete requests, the deactivation module 412 to service deactivation requests, or the like as described with regard to the respective modules. For example, in one embodiment, the snapshot interface module 404 may provide access to an activated snapshot using a logical-to-physical address mapping structure built or constructed by the activation module 306, as described above.

One example use case for a storage client 116 may include the storage client 116 performing I/O on the non-volatile memory device 120, while periodically creating snapshots (e.g., sending snapshot create requests to the snapshot interface module 404 for the creation module 304 to create snapshots), once every hour or the like. Old snapshots may be deleted periodically, in response to snapshot delete requests as described below with regard to the deletion module 410 or the like, helping the non-volatile memory device 120 to reclaim space. Occasionally, the storage client 116 may decide to restore a corrupted or deleted file or other data, and may send a snapshot activation request for the data to the snapshot interface module 404 to activate a snapshot for the data. In response to the activation module 306 activating the snapshot, the storage client 116 may mount a file system present in the activated snapshot to perform file operations on the non-volatile memory device 120 or the like. Once the storage client 116 has restored the files or other data, the storage client 116 may unmount the file system, deactivate the snapshot by sending a snapshot deactivate request to the snapshot interface module 404, or the like.

The snapshot interface module 404, in certain embodiments, provides a storage client 116 with access to a snapshot of data. For example, the snapshot interface module 404 may provide both read and write access to a snapshot of data in substantially the same manner as the current or newest version of data. By providing write access to a snapshot of a previous version of data, the snapshot interface module 404 may allow a storage client 116 to isolate certain changes or operations to a snapshot, ensuring that the most recent or newest version of the data is not affected.

In one embodiment, each temporal range or epoch preserved by the temporal order module 402 may be associated with a different snapshot. As described above, in certain embodiments, the temporal order module 402 may preserve just the most recent version of data in a temporal range or epoch. The snapshot interface module 404, in one embodiment, may provide the most recent version of data from a temporal range or epoch as a snapshot.

In one embodiment, the snapshot interface module 404 may provide access to a snapshot of data at a block layer, using a block I/O interface 131 or the like, so that storage clients 116 may access data of a snapshot by LBA. In another embodiment, the snapshot interface module 404 may provide access to a snapshot of data at a file system layer, using the SML interface 132 or the like, so that storage clients 116 may access data of a snapshot by filename or other file identifier. In a further embodiment, the snapshot interface module 404 may provide access to a snapshot of data using another persistent namespace. The snapshot interface module 404, in various embodiments, may provide a storage client 116 with access to one or more snapshots as a hidden or invisible subdirectory, files with appended tags or timestamps, over an API, using a shared library, over a block I/O interface 131, over an SML interface 132, or using another interface.

A snapshot request may include an epoch identifier, a snapshot name or number, or another snapshot identifier indicating which snapshot the storage client 116 is requesting. The snapshot interface module 404, in certain embodiments, may continue to provide access to a requested snapshot until the snapshot interface module 404 receives a subsequent snapshot request with a different snapshot identifier. In a further embodiment, each storage request, each snapshot request, or the like may include an epoch identifier or other snapshot identifier for a snapshot, allowing the snapshot interface module 404 to dynamically provide access to different snapshots.

To determine the state of data in a snapshot, in one embodiment, the activation module 306 may iterate through the sequential, log-based writing structure from the oldest data toward the newest data, replaying a sequence of changes to the data, to determine the state of data in a snapshot, to determine a logical-to-physical mapping for a snapshot, or the like based on stored epoch identifiers, as described above. In a further embodiment, the activation module 306 may rollback a series of changes to data in the sequential, log-based writing structure from the newest data toward the oldest data, undoing a sequence of changes to the data, to determine the state of data in a snapshot, to determine a logical-to-physical mapping for a snapshot, or the like based on stored epoch identifiers.

In another embodiment, as described above, the temporal order module 402 may maintain one or more data structures mapping or tracking locations of data for temporal ranges or epochs of data, so that the snapshot interface module 404 may provide access to a snapshot of a particular temporal range or epoch without iterating through and/or rolling back changes in a sequential, log-based writing structure. For example, the temporal order module 402 may maintain a logical-to-physical mapping structure for each snapshot, mapping logical addresses of a snapshot to the physical locations of the data in the sequential, log-based writing structure of the non-volatile memory media 122, may maintain a single logical-to-physical mapping structure that maps epoch identifiers for different snapshots to the locations of the associated temporal ranges or epochs in the non-volatile memory media 122, or the like which the snapshot interface module 404 may provide access to a snapshot of a particular temporal range or epoch of data.

In certain embodiments, to activate a snapshot in response to a snapshot request or the like, the snapshot interface module 404 and/or the activation module 306 may validate or otherwise determine whether the requested snapshot exists. The snapshot tracking module 408 may maintain a snapshot tree or other snapshot tracking data structure that indexes and/or tracks which snapshots exist, associates snapshots with temporal metadata such as an epoch identifier, validity metadata such as validity bitmaps, logical-to-physical mappings, or the like, or otherwise tracks dependency relationships between different snapshots. In a further embodiment, the activation module 306 may write a snapshot-activate note or other snapshot-activation indicator to the sequential, log-based writing structure of the non-volatile memory device 120, indicating to the reconstruction module 416 described below which snapshot is currently active in response to the reconstruction module 416 reconstruct a logical-to-physical mapping structure in response to a power failure, an improper shutdown, or another restart event, during a startup process for the non-volatile memory device 120 or the like, so that the reconstruction module 416 may reconstruct the logical-to-physical mapping structure associated with the active snapshot, epoch, and/or clone.

In one embodiment, in response to the snapshot interface module 404 receiving a snapshot request or the like, the snapshot interface module 404 and/or the temporal order module 402 may increment an epoch identifier or epoch counter to create a new epoch, which inherits data from the activated snapshot. The snapshot interface module 404, in cooperation with the reconstruction module 416 and/or the activation module 306 based on a snapshot-tree or other snapshot data structure or metadata from the snapshot tracking module 408, the validity module 406, or the like may reconstruct, retrieve, or otherwise determine a validity bitmap or other validity metadata and/or a logical-to-physical mapping for an activated snapshot. The snapshot interface module 404 may provide read and/or write access to an activated snapshot. In response to a snapshot deactivation request, a snapshot request to activate a different snapshot, or the like, the snapshot interface module 404 may cooperate with the deactivation module 412 to deactivate an activated snapshot by writing a snapshot-deactivation note or other snapshot-deactivation indicator to the sequential, log-based writing structure of the non-volatile memory device 120 or the like, so that the deactivation is persistent.

The snapshot interface module 404, in certain embodiments, supports one or more commands for managing temporal ranges, epochs, and/or snapshots, such as a new epoch request or new snapshot request, a delete epoch request or snapshot delete request, a delete all request, an enumerate request, a report total request, a set epoch interval request, or the like. As described above, the temporal order module 402 may increment an epoch identifier and mark a temporal range or epoch of data with the incremented epoch identifier in response to a new epoch request, a new snapshot request, or the like, thereby creating or initializing a new epoch and/or snapshot.

In response to a new epoch request, a new snapshot request, or the like, the snapshot interface module 404 may cooperate with the creation module 304 to quiesce, pause, hold, delay, or otherwise stop, at least temporarily, writes to the non-volatile memory device 120. The snapshot interface module 404, in response to quiescing or otherwise stopping writes, may cooperate with the creation module 304 to write a snapshot-create note or other snapshot identifier or epoch identifier to an append point of the sequential, log-based writing structure of the non-volatile memory device 120. In other embodiments, the temporal order module 402 may begin using a new epoch identifier in response to a new epoch request, a new snapshot request, or the like without quiescing or otherwise stopping writes. The snapshot interface module 404, in certain embodiments, may cooperate with the creation module 304 and/or the snapshot tracking module 408 to add a new snapshot and/or epoch to a snapshot tree or other snapshot tracking data structure.

The snapshot interface module 404, in certain embodiments, may cooperate with the deletion module 410 to delete, remove, trim, invalidate, erase, or otherwise clear a temporal range of data, epoch, and/or snapshot in response to a delete epoch request, a snapshot delete request, or the like thereby freeing storage capacity of the non-volatile memory device 120. The snapshot interface module 404 may cooperate with the storage capacity recovery module 414 and/or the deletion module 410 described below to satisfy a delete epoch request, a snapshot delete request, or the like. In a further embodiment, the storage capacity recovery module 414 may dynamically expire a temporal range of data, an epoch, and/or a snapshot delete request without a delete epoch request, a snapshot delete request, or the like. For example, the storage capacity recovery module 414 may delete, remove, trim, invalidate, erase, or otherwise clear an oldest epoch, an oldest snapshot, another selected epoch or snapshot, or the like, in response to an amount of data in the non-volatile memory device 120 satisfying a capacity threshold, or another expiration event.

To delete an epoch and/or snapshot, in one embodiment, the snapshot interface module 404 may cooperate with the deletion module 410 to write a snapshot-delete note or indicator to an append point of the sequential, log-based writing structure of the non-volatile memory device 120, to persist the delete operation or the like. The snapshot interface module 404, in a further embodiment, may cooperate with the deletion module 410 and/or the snapshot tracking module 408 to delete or otherwise remove a snapshot from a snapshot tree or other snapshot tracking data structure, thereby preventing future attempts to access a deleted snapshot. Once the snapshot interface module 404 has cooperated with the deletion module 410 to mark a snapshot or epoch as deleted, in the sequential, log-based writing structure and/or in a snapshot data structure, tree or the like, the storage capacity recovery module 414 may reclaim storage capacity associated with the deleted snapshot or epoch as described below.

In one embodiment, the snapshot interface module 404 and/or the deletion module 410 support a delete all request from a client 116. A delete all request may be to delete, clear, remove, erase, invalidate, trim, and/or discard all epochs, snapshots, and/or clones from the non-volatile memory device 120, all but a most recent epoch, snapshot, and/or clone, or the like. In a further embodiment, the snapshot interface module 404 supports an enumerate request from a client 116, to list or enumerate each epoch, snapshot, and/or clone from the non-volatile memory device 120, to list or enumerate each epoch, snapshot, and/or clone owned by an identified client 116, or the like to a requesting client 116. The snapshot interface module 404, in certain embodiments, may enumerate epochs, snapshots, and/or clones indexed or identified by epoch identifier, a snapshot identifier, or the like, in response to an enumerate request.

In response to a report total request, in certain embodiments, the snapshot interface module 404 may list to a requesting client 116 how many epochs and/or snapshots exist for the non-volatile memory device 120, how many exist for and/or are owned by the requesting client 116, or the like. In one embodiment, the snapshot interface module 404 supports a set epoch interval request from a client 116, allowing the client 116 to define how often and/or set an interval, in units of time, that the temporal order module 402 increments or updates an epoch identifier to create a new epoch, snapshot, and/or clone.

In one embodiment, the validity module 406 is configured to maintain validity metadata for a plurality of different snapshots, different epochs, or the like so that a storage capacity recovery operation may retain data that is valid for any one of the different snapshots based on the validity metadata. The validity module 406, in certain embodiments, may maintain different validity maps for different snapshots in volatile memory 112, in the non-volatile memory media 122, or the like. In other embodiments, the validity module 406 may cooperate with the activation module 306 to rebuild or construct a validity map for an activated snapshot by scanning the sequential, lot-based writing structure in response to a snapshot activate request.

In one embodiment, the validity metadata comprises valid/invalid indicators, such as a validity map or an invalidity map, identifying which data in the non-volatile memory device 120 is valid and which data in the non-volatile memory device 120 is invalid. The validity metadata may be specific to a certain epoch or snapshot, may be dependent on or inherit attributes from validity metadata for another snapshot or epoch, or the like. As used herein, a map may refer to any associative data structure associating a collection of unique keys with respective values. Looking up a unique key in a map returns the associated value. The validity map, in one embodiment, associates storage units, such as blocks, packets, sectors, pages, ECC chunks, or the like, of the non-volatile memory device 120 with a validity indicator that specifies that the data associated with the unit is either valid or invalid. The validity indicator, in certain embodiments, includes a bit in the validity map, with one state representing valid data and the other state representing invalid data.

A validity map or other validity metadata, in various embodiments, may include a bitmap, a table, a list, and/or another data structure known in the art. For example, a validity map or other validity metadata may include a data structure suited for managing a very large and potentially sparsely populated domain such as an address space, comprising representations of valid or invalid storage units (and/or storage unit sets or ranges). For example, a validity map may comprise a sparse array with an entry for each storage unit that includes valid data. An invalidity map may be derived from a validity map (e.g., if a location is not in the validity map, then the location is invalid) or vice versa.

The validity metadata indicates the validity of each physical packet or other unit or segment of data on the log-based writing structure. Data overwrites, in certain embodiments, translate to append operations onto the sequential, log-based writing structure and older versions of data may be invalidated and their storage capacity reclaimed. Thus, a logical block address overwrite may result in the validity module 406 clearing a bit corresponding to the old packet's physical address being cleared in the validity map or other validity metadata and the validity module 406 may set a new bit corresponding to the new location.

In certain embodiments, the validity module 406 uses a copy-on-write procedure for validity metadata to efficiently use storage capacity of the volatile memory 112 and/or the non-volatile memory media 120, depending on the location where the validity module 406 stores the validity metadata. For example, the validity module 406 may cause a validity map for a new snapshot to inherit the validity metadata of a previous snapshot (e.g., a parent snapshot), and may copy a portion of the previous validity metadata for the parent snapshot only when a write request is received for the new snapshot, causing the validity metadata to diverge for the two snapshots. The validity module 406 may then update the copy of the validity metadata to reflect the write request (e.g., invalidating old data, marking the new data of the write request as valid). The previous validity metadata, in one embodiment, does not change, as the old data was valid at the time of the previous snapshot. Since data for a snapshot or epoch may tend to remain in close proximity in the sequential, log-based writing structure, the validity module 406 may effectively reduce an amount of storage capacity used to store validity maps by using a dependency and/or inheritance system for different snapshots.

The temporal ordering of the log-based writing structure described above with regard to the temporal order module 402, in certain embodiments, may guarantee or tend to cause spatial collocation of blocks belonging to the same epoch or snapshot. So, in one embodiment, until data is moved by the storage capacity recovery module 414, to an append point of the sequential, log-based writing structure or the like, the validity bitmaps or other metadata corresponding to an epoch or snapshot may also be relatively localized (e.g., most validity bitmap blocks may be unused and few may correspond to valid blocks written during the epoch for a snapshot). In such embodiments, the copy-on-write procedure may be particularly efficient. The validity module 406 may mark validity bitmap blocks as copy-on-write, or the like. When an attempt is made to modify a block of validity metadata marked copy-on-write, the validity module 406 may create a copy of the block and link the copy to the snapshot (or epoch) whose state it represents. The validity metadata pages that were copied, in certain embodiments, may be read-only (until reclamation or the like) and the validity module 406 may destage pages of validity metadata from the volatile memory 112 to the sequential, log-based writing structure.

As described below, the storage capacity recovery module 414 may retain, during a storage capacity recovery operation, data marked as valid for any one of the different snapshots for the non-volatile memory device 120. The validity module 406 may cooperate with the storage capacity recovery module 414 to determine which data is valid for at least one snapshot. For example, the validity module 406 may merge the different validity maps, using a logical OR operation or the like, and determine which data of a selected storage region is valid for at least one of the snapshots, so that the storage capacity recovery module 414 may copy or write the valid data to a different storage region (e.g., an append point of the sequential, log-based writing structure) and may recover the storage capacity of the selected storage region. In response to the storage capacity recovery module 414 moving data, the validity module 406 may update one or more validity bitmaps or other validity metadata for snapshots or epochs associated with the data (e.g., marking the data at the new location as valid, marking the old locations as invalid, or the like).

The validity module 406, in one embodiment, may not modify the validity bitmap or other validity metadata for a snapshot or epoch unless the storage capacity recovery module 414 moves data of the snapshot or epoch. Like epochs, the validity bitmap or other validity metadata for a snapshot may inherit the validity bitmap or other validity metadata of its parent to represent the state of the inherited data. The active log-based writing structure may continue to modify the inherited validity bitmap, using a copy-on-write approach, or the like. In other embodiments, instead of a copy-on-write method, the validity module 406 may maintain full copies of the validating bitmaps or other validity metadata for each snapshot and/or epoch.

In one embodiment, the snapshot tracking module 408 is configured to add an entry for a created or initialized snapshot to a snapshot data structure, such as a snapshot tree, that defines dependencies or other relationships between a plurality of snapshots. One example of a snapshot data structure is described below with regard to FIG. 12. In certain embodiments, a snapshot created at any point in time may be related to a select set of snapshots created before it. The moment a snapshot is created, every block of data, in one embodiment, may be pointed to by an active logical-to-physical mapping structure, and the newly created snapshot. Thus, in certain embodiments, the active logical-to-physical mapping structure may implicitly or otherwise inherit data from the snapshot that was created. As subsequent write requests are issued by storage clients 116, the state of the active logical-to-physical mapping structure may diverge from the state of the snapshot, until the moment another snapshot is created. The newly created snapshot may then capture the set of all changes that took place between the first snapshot and the point at which the new snapshot was created by the creation module 304 as described above. As more snapshots are created and/or activated, the snapshot tracking module 408 may keep track of the relationships and dependencies between the snapshots in the form of a snapshot tree or other snapshot data structure.

In one embodiment, the deletion module 410 may service snapshot delete requests from storage clients 116 to delete or remove snapshots, to recover storage capacity of the snapshots or the like. In certain embodiments, the deletion module 410 may automatically delete or remove snapshots, expiring a snapshot after a predefined amount of time has passed since its creation, after a predefined amount of time has passed without activating the snapshot, or the like.

For snapshot deletion, the deletion module 410 may write a snapshot-delete indicator, message, or note to the sequential, log-based writing structure, making the delete persistent for the reconstruction module 416 or the like. A snapshot-delete indicator may include a snapshot identifier for a deleted snapshot, such as an epoch identifier, a snapshot name, a snapshot number, or the like. The storage capacity recovery module 414 may lazily or opportunistically recover the storage capacity of deleted snapshots, which the deletion module 410 may mark as invalid in cooperation with the validity module 406 or the like.

In one embodiment, the deactivation module 412 services snapshot deactivation requests from storage clients 116. In one embodiment, the deactivation module 412 writes a snapshot-deactivation indicator, message, or note on the sequential, log-based writing structure, making the deactivation persistent for the reconstruction module 416 or the like. A snapshot-deactivate indicator may include a snapshot identifier for a deactivated snapshot, such as an epoch identifier, a snapshot name, a snapshot number, or the like. In certain embodiments, the deactivation module 41 may cooperate with the snapshot tracking module 408 to process or clean-up of the snapshot data structure, indicating that the snapshot has been deactivated. The activation module 306 may activate a latest version of data, a predefined snapshot, or the like in response to the deactivation module 412 deactivating a snapshot.

In one embodiment, the storage capacity recovery module 414 recovers storage capacity of physical non-volatile memory media 122 corresponding to data that is marked as invalid, such as data invalidated by a subsequent write request for one or more logical addresses of the data, data of an expired temporal range or epoch, or the like. The storage capacity recovery module 414, in certain embodiments, recovers storage capacity of physical non-volatile memory media 122 corresponding to invalid data opportunistically. For example, the storage capacity recovery module 414 may recover storage capacity in response to a storage capacity recovery event, such as a lack of available storage capacity, a percentage of data marked as invalid reaching a predefined threshold level, a consolidation of valid data, an error detection rate for a section of physical non-volatile memory media 122 reaching a threshold value, performance crossing a threshold value, a scheduled garbage collection cycle, identifying a section of the physical non-volatile memory media 122 with a high amount of invalid data, identifying a section of the physical non-volatile memory media 122 with a low amount of wear, or the like.

In one embodiment, the storage capacity recovery module 414 relocates valid data that is in a section of the physical non-volatile memory media 122 in the non-volatile memory device 120 that the storage capacity recovery module 414 is recovering to preserve the valid data. The storage capacity recovery module 414, in a further embodiment, relocates or copies forward data that is valid for any preserved temporal range, epoch, or snapshot, even if the data was subsequently invalidated. Erasing data without relocating the data evicts, removes, deletes, erases, or otherwise clears the data from the non-volatile memory device 120.

The storage capacity recovery module 414, in one embodiment, may select one or more temporal ranges or epochs of data to expire or remove from the non-volatile memory device 120 (e.g., remove invalid data of the temporal range or epoch that is not associated with another temporal range) based on a delete epoch request from a storage client 116, based on an eviction policy, based on a determined cost for the temporal range or epoch, a frequency of use for data of the temporal range or epoch, or the like. In another embodiment, the storage capacity recovery module 414 clears or erases all invalid data in a section of the physical non-volatile memory media 122 that the storage capacity recovery module 414 has selected for grooming.

In one embodiment, the storage capacity recovery module 414 is part of an autonomous garbage collector system that operates within the non-volatile memory device 120. This allows the non-volatile memory device 120 to manage data to provide wear leveling so that data is systematically spread throughout the solid-state non-volatile memory media 122, or other physical storage media, to improve performance, data reliability, to avoid overuse and underuse of any one location or area of the solid-state non-volatile memory media 122, to lengthen the useful life of the solid-state non-volatile memory media 122, or the like.

The storage capacity recovery module 414, upon recovering a section of the physical non-volatile memory media 122, allows the non-volatile memory device 120 to re-use the section of the physical non-volatile memory media 122 to store different data. In one embodiment, the storage capacity recovery module 414 adds the recovered section of physical non-volatile memory media 122 to an available storage pool for the non-volatile memory device 120, or the like. The storage capacity recovery module 414, in one embodiment, erases existing data in a recovered section. In a further embodiment, the storage capacity recovery module 414 allows the non-volatile memory device 120 to overwrite existing data in a recovered section. Whether or not the storage capacity recovery module 414, in one embodiment, erases existing data in a recovered section may depend on the nature of the physical non-volatile memory media 122. For example, Flash media requires that cells be erased prior to reuse where magnetic media such as hard drives does not have that requirement. In an embodiment where the storage capacity recovery module 414 does not erase data in a recovered section, but allows the non-volatile memory device 120 to overwrite data in the recovered section, the storage capacity recovery module 414, in certain embodiments, may mark the data in the recovered section as unavailable to service read requests so that subsequent requests for data in the recovered section return a null result or an empty set of data until the non-volatile memory device 120 overwrites the data.

In one embodiment, the storage capacity recovery module 414 recovers storage capacity of the non-volatile memory device 120 one or more storage divisions at a time. A storage division, in one embodiment, includes a logical or physical erase block or other predefined division. For flash memory, an erase operation on an erase block writes ones to every bit in the erase block. This may be a lengthy process compared to a program operation which starts with a location being all ones, and as data is written, some bits are changed to zero. However, where the solid-state storage 110 is not flash memory or has flash memory where an erase cycle takes a similar amount of time as other operations, such as a read or a program, the snapshot interface module 404 may erase the data of a storage division as it deletes a temporal range or epoch of data, instead of the storage capacity recovery module 414.

In one embodiment, allowing the snapshot interface module 404 to mark data as invalid rather than actually erasing the data in response to a delete epoch request and allowing the storage capacity recovery module 414 to recover the physical media associated with invalid data, increases efficiency because, as mentioned above, for flash memory and other similar storage an erase operation may take a significant amount of time. Allowing the storage capacity recovery module 414 to operate autonomously and opportunistically within the non-volatile memory device 120 provides a way to separate erase operations from reads, writes, and other faster operations so that the non-volatile memory device 120 operates efficiently.

As described above, the temporal order module 402 may preserve the temporal and/or sequential order of data across a storage capacity recovery event as the storage capacity recovery module 414 copies data forward on the sequential, log-based writing structure, using epoch identifiers or the like. In certain embodiments, the storage capacity recovery module 414 is configured to copy data from a temporal range and one or more associated epoch identifiers forward to an append point of the sequential, log-based writing structure. In a further embodiment, the storage capacity recovery module 414 may copy data from a recovered temporal range of data or epoch to a different append point of the sequential, log-based writing structure than an intake append point, as described above, so that data from different temporal ranges or epochs remain separate in the sequential, log-based writing structure, or the like.

In certain embodiments, the storage capacity recovery module 414 may perform storage capacity recovery during idle or low workload times of the non-volatile memory device 120, a device driver for the non-volatile memory device 120, or the like. The storage capacity recovery module 414 may select a storage region (e.g., a logical or physical erase block) for storage capacity recovery that have a high-degree of data intermixed from different epochs, different snapshots, or the like, and may group or collocate the data from different epochs, different snapshots, or the like at one or more new locations. The storage capacity recovery module 414, in one embodiment, may process multiple storage regions at a time, to collect enough data from different epochs and/or snapshots to fill a new storage region substantially with valid data for a single epoch and/or snapshot, to minimize the complexity and/or size of validity metadata for the epoch and/or snapshot. In a further embodiment, the storage capacity recovery module 414 may also select storage regions for storage capacity recovery based on a "coldness" of data of one or more snapshots stored in the storage region (e.g., an amount of time since data of a snapshot has been modified), thereby minimizing a probability that the data of the one or more snapshots will be selected for storage capacity recovery in the future.

In the presence of foreground workload for the non-volatile memory device 120, a device driver for the non-volatile memory device 120, or the like, the storage capacity recovery module 414 may minimize intermixing of data for different snapshots and/or epochs. For storage capacity recovery during busy times with foreground workload, the storage capacity recovery module 414 may select a storage region for storage capacity recovery that have minimal valid data, are cold in the log-based writing structure (e.g., have not been recently accessed), and/or that belong to an active snapshot, an active logical-to-physical mapping structure, or the like. In this manner, the storage capacity recovery module 414 may maintain or attempt to maintain a single validity bitmap or other validity metadata for the storage region (e.g., append point) to which both recovered valid data and active workload data are written. If the storage capacity recovery module 414 cannot locate a storage region for storage capacity recovery that belongs to the active snapshot and/or logical-to-physical mapping structure, the storage capacity recovery module 414 may select a storage region with minimal intermixing of data from different epochs and/or snapshots to minimize a size of the validity bitmap or other validity metadata for the storage region (e.g., append point) to which recovered valid data and active workload data are being written.

In one embodiment, the storage capacity recovery module 414 may limit or stop storage capacity recovery during activation of a snapshot, to accommodate rebuilding of a logical-to-physical mapping structure, validity metadata, or the like. The storage capacity recovery module 414 may be configured to perform storage capacity recovery at variable rates based on foreground workloads, snapshot activation, and/or other foreground activities, thereby accounting for performance of snapshot operations to provide more consistent user performance.

In embodiments where the temporal order module 402 preserves just a latest version of data for each temporal range or epoch, the storage capacity recovery module 414 may copy the latest version of data written in a temporal range or epoch forward to an append point of the sequential, log-based writing structure, and may erase, delete, remove, trim, or otherwise clear older invalid versions of the data during a storage capacity recovery operation. In other embodiments, the storage capacity recovery module 414 may preserve and copy forward multiple versions of data, both valid and invalid, from a temporal range or epoch.

In one embodiment, the reconstruction module 416 determines one or more logical-to-physical mappings, validity metadata, or the like for previous states of data (e.g., a temporal range or epoch of data, a snapshot, or the like) based on the temporal and/or sequential order that the temporal order module 402 preserves, so that the snapshot interface module 404 may use the logical-to-physical mappings and/or validity metadata to provide access to the previous states of data. The reconstruction module 416, in certain embodiments, may cooperate with the temporal order module 402 to rebuild or reconstruct a lost or damaged mapping structure, validity metadata, or the like as described above by scanning the sequential, log-based writing structure to locate epoch identifiers. The reconstruction module 416 may create mappings between the epoch identifiers (or associated logical addresses) and the physical locations in the non-volatile memory media 122, reconstruct validity metadata, or the like as the reconstruction module 416 scans the sequential, log-based writing structure.

In one embodiment, the reconstruction module 416 may determine or reconstruct a logical-to-physical mapping structure and/or validity metadata (e.g., a validity bitmap) for a single snapshot, temporal range, or epoch, mapping logical addresses of the snapshot, temporal range, or epoch to the physical locations of the data in the sequential, log-based writing structure of the non-volatile memory media 122. In a further embodiment, where temporal ranges or epochs are contiguous within a sequential, log-based writing structure or the like, the reconstruction module 416 may determine or reconstruct a single logical-to-physical mapping structure and/or validity metadata for multiple snapshots, temporal ranges, or epochs that maps epoch identifiers to the contiguous location of the associated temporal ranges or epochs in the non-volatile memory media 122.

A restart event, as used herein, comprises an intentional or unintentional loss of power to at least a portion of the computing device 110 and/or a storage device 120. A restart event may comprise a system reboot, reset, or shutdown event; a power fault, power loss, or power failure event; or another interruption of power. By reconstructing snapshots, logical-to-physical mapping structures, and/or validity metadata, the reconstruction module 416 may allow the storage clients 116 to resume use of snapshots, execution states, or the like even after a restart event, may allow the storage clients 116 to persist different independent data sets, or the like.

In one embodiment, the reconstruction module 416 may reconstruct one or more logical-to-physical mapping structures, a snapshot data structure, validity metadata, or the like in response to a power failure, an improper shutdown, or another restart event, during a startup process for the non-volatile memory device 120 or the like. In the case of a proper shutdown, in certain embodiments, the temporal order module 402 may store one or more logical mappings, validity bitmaps or other validity metadata, a snapshot data structure, or the like for snapshots, temporal ranges, and/or epochs to a known or predetermined location in the non-volatile memory media 122, and the reconstruction module 416 may simply retrieve the data from the non-volatile memory media 122 instead of reconstructing it. In a further embodiment, the reconstruction module 416 may dynamically determine or reconstruct a logical-to-physical mapping structure, validity metadata, and/or a snapshot data structure for the snapshot interface module 404 in response to a snapshot request or the like. For example, the reconstruction module 416 may apply one or more changes to an existing logical-to-physical mapping structure, to an existing validity bitmap, to an existing snapshot data structure, or the like to service a delta clone request, a rollback request, an iterate request, a snapshot request, or the like, or may scan the sequential, log-based writing structure to determine a new logical-to-physical mapping structure, a new validity bitmap, and/or a new snapshot data structure to service a delta clone request, a rollback request, an iterate request, a snapshot request, or the like.

In one embodiment, the reconstruction module 416 may only reconstruct an active logical-to-physical mapping structure, an active validity bitmap, or the like, without reconstructing metadata for non-active snapshots, providing a more efficient reconstruction process. To reconstruct a logical-to-physical mapping structure, the reconstruction module 416 may identify snapshots in the sequential, log-based writing structure and construct a snapshot data structure identifying inheritance relationships between the snapshots or the like. The reconstruction module 416 may use the reconstructed snapshot data structure to determine which logical-to-physical mappings are associated with an active snapshot or active state of the non-volatile memory device 120 (e.g., data that belongs to an epoch of the active snapshot or an epoch of a parent or ancestor of the active snapshot in the snapshot data structure).

To reconstruct a validity bitmap, in certain embodiments, the reconstruction module 416 may sort data based on an epoch in which the data was created or written in, a snapshot associated with the data, or the like. The reconstruction module 416 may eliminate duplicate (e.g., older) validity entries and uniquely identify data that is both valid and active in the epoch and/or snapshot under consideration. Once valid and active entries are identified, the reconstruction module 416 may construct a validity bitmap or other validity metadata for one or more epochs for an active snapshot. For example, the reconstruction module 416 may start from a root of a snapshot tree until it reaches leaf nodes in a breadth first manner, reconstructing validity metadata as it processes nodes or the like. The reconstruction module 416 may determine a final validity bitmap or other validity metadata for one or more active epochs or snapshots by merging validity bitmaps or other metadata for each epoch or snapshot that contributes data to the one or more active epochs or snapshots (e.g., parent or ancestor epochs and/or snapshots). While merging, the reconstruction module 416 may eliminate duplicates or invalidated entries.

Figure 5:
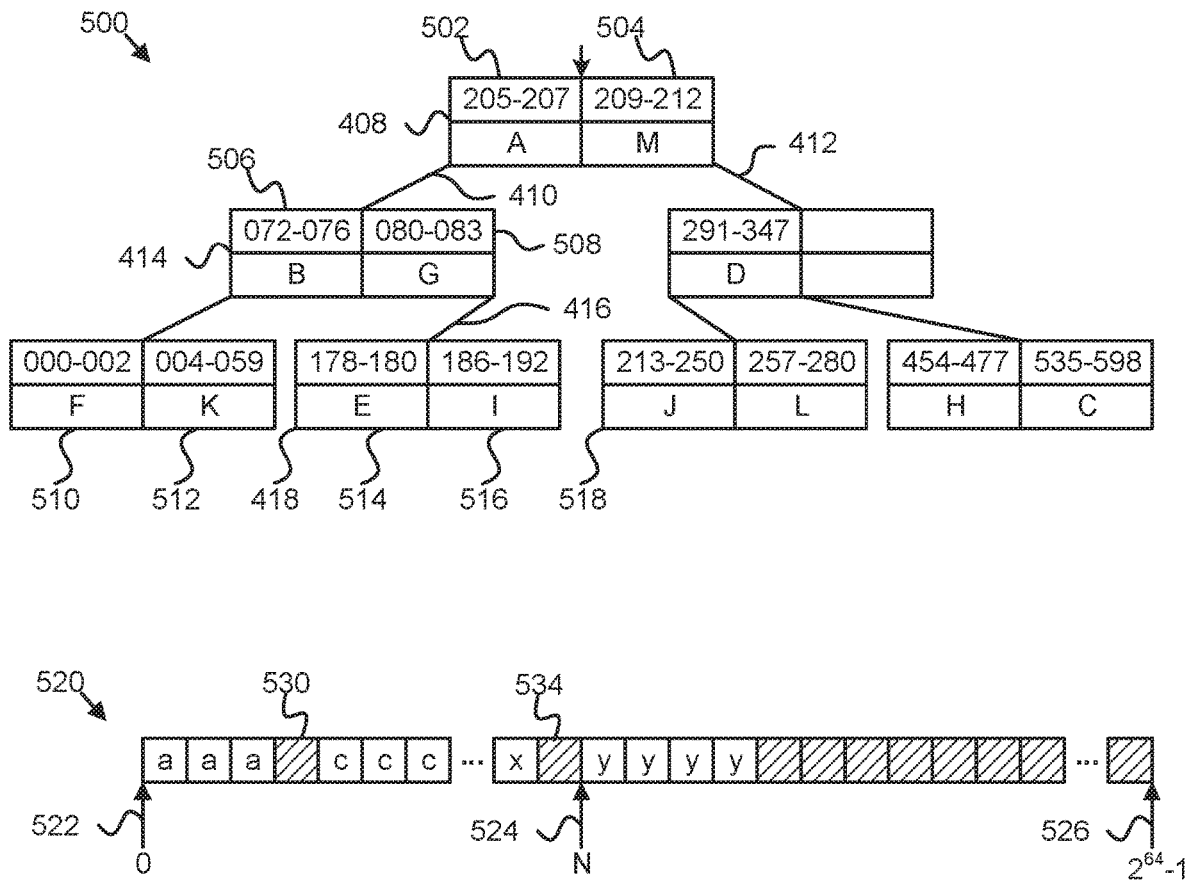
FIG. 5 is a schematic block diagram illustrating one embodiment of a mapping structure, a logical address space, and a sequential, log-based writing structure.
Figure 5:
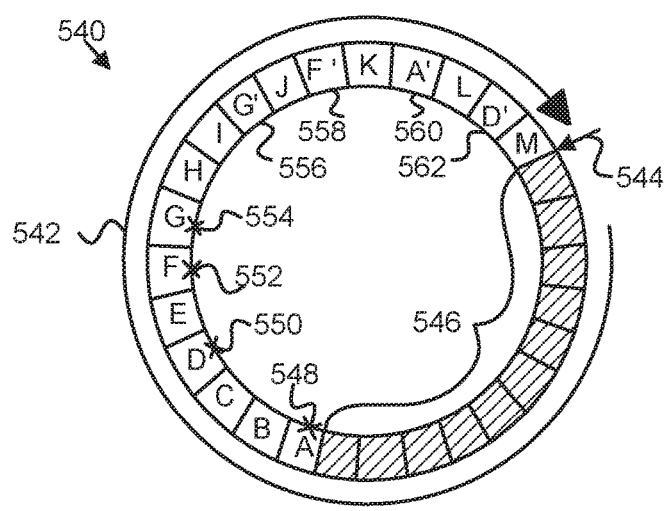

FIG. 5 depicts one embodiment of a mapping structure 500, a logical address space 520, and a sequential, log-based writing structure 540. The mapping structure 500, in one embodiment, may be maintained by the SML 130, the temporal order module 402, determined or reconstructed by the reconstruction module 416, of the like to map LBAs or other logical addresses to physical locations on the non-volatile memory media 122. The mapping structure 500 may be for all data stored on the non-volatile memory device 120, may be for a snapshot, temporal range, or epoch of data, or the like.

The mapping structure 500, in the depicted embodiment, is a B-tree with several entries. The logical-to-physical address mapping structure 500, in various embodiments, may include a B-tree, B*-tree, B+-tree, a CAM, a binary tree, a hash table, an index, an array, a linked-list, a look-up table, or another mapping data structure. Use of a B-tree or similar variant as the logical-to-physical address mapping structure 500 in certain embodiments, is particularly advantageous where the logical address space presented to the client is a very large address space (such as $2^{64}$ addressable blocks or the like—which may or may not be sparsely populated). Because B-trees maintain an ordered structure, searching such a large space remains very fast. For example, in one embodiment, the logical-to-physical address mapping structure includes a B-tree with multiple nodes and each node may store several entries. In the example embodiment, each entry may map a variable sized range of logical addresses of the non-volatile memory device 120 to a location (such as a starting location) on the physical storage media 122 of the non-volatile memory device 120. Furthermore, the number of nodes in the B-tree may vary as the B-tree grows wider and/or deeper.

In the depicted embodiment, the nodes of the mapping structure 500 include direct references to physical locations in the non-volatile memory device 120. In other embodiments, the mapping structure 500 may include links that map to entries in a reverse map, or the like. The mapping structure 500, in various embodiments, may be used either with or without a reverse map. In other embodiments, the references in the mapping structure 500 may include alpha-numerical characters, hexadecimal characters, pointers, links, or the like.

The mapping structure 500, in the depicted embodiment, includes a plurality of nodes. Each node, in the depicted embodiment, is capable of storing two entries. In other embodiments, each node may be capable of storing a greater number of entries, the number of entries at each level may change as the mapping structure 500 grows or shrinks through use, or the like.

Each entry, in the depicted embodiment, maps a variable length range of LBAs of the non-volatile memory device 120 to a physical location in the non-volatile memory media 122 for the non-volatile memory device 120. Further, while variable length ranges of LBAs, in the depicted embodiment, are represented by a starting address and an ending address, in other embodiments, a variable length range of LBAs may be represented by a starting address and a length, or the like. In one embodiment, the capital letters 'A' through 'M' represent a logical or physical erase block in the physical non-volatile memory media 122 of the non-volatile memory device 120 that stores the data of the corresponding range of LBAs. In other embodiments, the capital letters may represent other physical addresses or locations of the non-volatile memory device 120. In the depicted embodiment, the capital letters 'A' through 'M' are also depicted in the log-based writing structure 540 which represents the physical non-volatile memory media 122 of the non-volatile memory device 120.

In the depicted embodiment, membership in the mapping structure 500 denotes membership (or storage) in the non-volatile memory device 120. In another embodiment, an entry may further include an indicator of whether the non-volatile memory device 120 stores data corresponding to a logical block within the range of LBAs, data of a reverse map, and/or other data. In further embodiments, membership in the mapping structure 500 may denote membership in a snapshot, temporal range or epoch of data associated with the mapping structure 500.

In the depicted embodiment, the root node 408 includes entries 502, 504 with noncontiguous ranges of LBAs. A "hole" exists at LBA "208" between the two entries 502, 504 of the root node. In one embodiment, a "hole" indicates that the non-volatile memory device 120 does not store data corresponding to one or more LBAs corresponding to the "hole." In one embodiment, the non-volatile memory device 120 supports block I/O requests (read, write, trim, etc.) with multiple contiguous and/or noncontiguous ranges of LBAs (i.e. ranges that include one or more "holes" in them). A "hole," in one embodiment, may be the result of a single block I/O request with two or more noncontiguous ranges of LBAs. In a further embodiment, a "hole" may be the result of several different block I/O requests with LBA ranges bordering the "hole."

In the depicted embodiment, similar "holes" or noncontiguous ranges of LBAs exist between the entries 506, 508 of the node 414, between the entries 510, 512 of the left child node of the node 414, between entries 514, 516 of the node 418, and between entries of the node 518. In one embodiment, similar "holes" may also exist between entries in parent nodes and child nodes. For example, in the depicted embodiment, a "hole" of LBAs "060-071" exists between the left entry 506 of the node 414 and the right entry 512 of the left child node of the node 414.

The "hole" at LBA "003," in the depicted embodiment, can also be seen in the logical address space 520 of the non-volatile memory device 120 at logical address "003" 530. The hash marks at LBA "003" 540 represent an empty location, or a location for which the non-volatile memory device 120 does not store data. The "hole" at LBA 534 in the logical address space 520, is due to one or more block I/O requests with noncontiguous ranges, a trim or other deallocation command to the non-volatile memory device 120, or the like. The mapping structure 500 supports "holes," noncontiguous ranges of LBAs, and the like due to the sparse and/or thinly provisioned nature of the logical address space 520.

The logical address space 520 of the non-volatile memory device 120 (or of a particular snapshot, temporal range or epoch), in the depicted embodiment, is sparse and/or thinly provisioned, and is larger than the physical storage capacity and corresponding storage device address space of the non-volatile memory device 120. In the depicted embodiment, the non-volatile memory device 120 has a 64 bit logical address space 520 beginning at logical address "0" 522 and extending to logical address "$2^{64}-1$" 526. Because the physical address space corresponds to only a subset of the logical address space 520 of the non-volatile memory device 120, the rest of the logical address space 520 may be allocated, mapped, and used for other functions of the non-volatile memory device 120.

The sequential, log-based writing structure 540, in the depicted embodiment, is a logical representation of the physical non-volatile memory media 122 of the non-volatile memory device 120. In certain embodiments, the non-volatile memory device 120 stores data sequentially, appending data to the log-based writing structure 540 at one or more append points 544. The non-volatile memory device 120, in a further embodiment, uses a storage space recovery process, such as the storage capacity recovery module 414, that re-uses non-volatile memory media 122 storing deallocated/unused logical blocks. Non-volatile memory media 122 storing deallocated/unused logical blocks, in the depicted embodiment, is added to an available storage pool 546 for the non-volatile memory device 120. By clearing invalid data from the non-volatile memory device 120, as described above, and adding the physical storage capacity corresponding to the cleared data back to the available storage pool 546, in one embodiment, the log-based writing structure 540 is cyclic, ring-like, and has a theoretically infinite capacity.

In the depicted embodiment, the append point 544 progresses around the sequential, log-based writing structure 540 in a circular pattern 542. In one embodiment, the circular pattern 542 wear balances the non-volatile memory media 122, increasing a usable life of the non-volatile memory media 122. In the depicted embodiment, the storage capacity recovery module 414 has marked several blocks 548, 550, 552, 554 as invalid, represented by an "X" marking on the blocks 548, 550, 552, 554. The storage capacity recovery module 414, in one embodiment, will recover the physical storage capacity of the invalid blocks 548, 550, 552, 554 and add the recovered capacity to the available storage pool 546. In other embodiments, the storage capacity recovery module 414 may preserve at least a most recent copy of data from each temporal range or epoch in the invalid blocks 548, 550, 552, 554, so that the snapshot interface module 404 may provide access to snapshots or other previous states of the data to satisfy snapshot requests or the like. In the depicted embodiment, modified versions of the blocks 548, 550, 552, 554 have been appended to the log-based writing structure 540 as new blocks 556, 558, 560, 562 in a read, modify, write operation or the like, allowing the original blocks 548, 550, 552, 554 to be recovered.

Figure 6A:
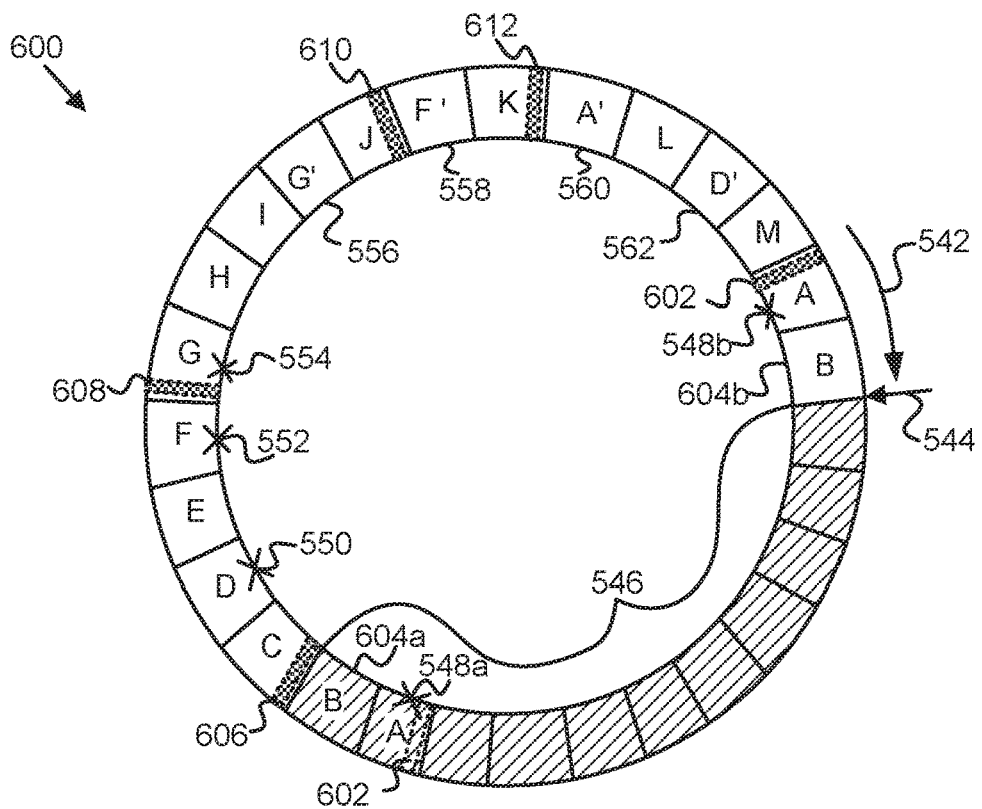
FIG. 6A is a schematic block diagram illustrating one embodiment of an epoch identifier.

FIG. 6A depicts one embodiment of a sequential, log-based writing structure 600 storing epoch identifiers 602, 606, 608, 610, 612. As described above, an epoch identifier 602, 606, 608, 610, 612 may include an indicator, marker, label, flag, field, packet, or other data structure identifying or preserving a temporal and/or sequential order for data in the sequential, log-based writing structure 600. An epoch identifier 602, 606, 608, 610, 612 may be absolute (e.g., a timestamp), relative (e.g., a sequence number), or may otherwise indicate a temporal and/or sequential order for data.

As described above, an epoch identifier 602, 606, 608, 610, 612 may be used as a snapshot identifier, may be associated with a snapshot identifier such as a snapshot name, may be included in a note or message written to the sequential, log-based writing structure 600 for a snapshot operation, such a snapshot-create indicator, a snapshot-delete indicator, a snapshot-activate indicator, a snapshot deactivate indicator, or the like. For example, the creation module 304 may mark a creation or initialization point for a snapshot in cooperation with the temporal order module 402 by incrementing an epoch identifier 602, 606, 608, 610, 612 and storing the incremented epoch identifier 602, 606, 608, 610, 612 in the sequential, log-based writing structure 600 as a snapshot-create indicator, as part of a snapshot-create indicator, or the like.

In the depicted embodiment, the temporal order module 402 marks or associates data with an epoch identifier 602, 606, 608, 610, 612, marks a point in the sequential, log-based writing structure 600 for a snapshot, or the like by inserting the epoch identifier 602, 606, 608, 610, 612 into the sequential, log-based writing structure 600 between temporal ranges or epochs of data. An epoch identifier 602, 606, 608, 610, 612, in the depicted embodiment, marks the beginning of a new temporal range or epoch of data, with all data between the epoch identifier 602, 606, 608, 610, 612 and a subsequent or next epoch identifier 602, 606, 608, 610, 612 belonging to the temporal range.

In the depicted embodiment, the storage capacity recovery module 414 has performed a storage capacity recovery operation to recover blocks 548a and 604a which stored data 'A' and 'B' associated with epoch identifier 602. To preserve the temporal and/or sequential order of data in the sequential, log-based writing structure 600, the temporal order module 402, in cooperation with the storage capacity recovery module 414 or the like, has copied or written forward the data of the temporal range associated with the epoch identifier 602 (e.g., data 'A' and 'B') from blocks 548a, 604a to blocks 548b and 604b at the append point 544 of the sequential, log-based writing structure 600, along with the epoch identifier 602. Even though data 'A' of block 548a has been invalidated by new data, as described above with regard to FIG. 5, the temporal order module 402 and/or the storage capacity recovery module 414 retain data 'A' of block 548a during the storage capacity recovery operation, so that the snapshot interface module 404 may provide access to both versions of data 'A' 548, 560.

In this manner, the data remains associated with the epoch identifier 602 across storage capacity recovery events, and the sequential, log-based writing structure 600 continues to maintain a temporal and/or sequential order of data. Additionally, by marking the beginning and/or ending of temporal ranges or epochs of data with epoch identifiers 602, 606, 608, 610, 612, in one embodiment, the temporal order module 402 preserves a temporal and/or sequential order for data without the overhead of storing an epoch identifier 602, 606, 608, 610, 612 in each packet or other predefined data segment.

Figure 6B:
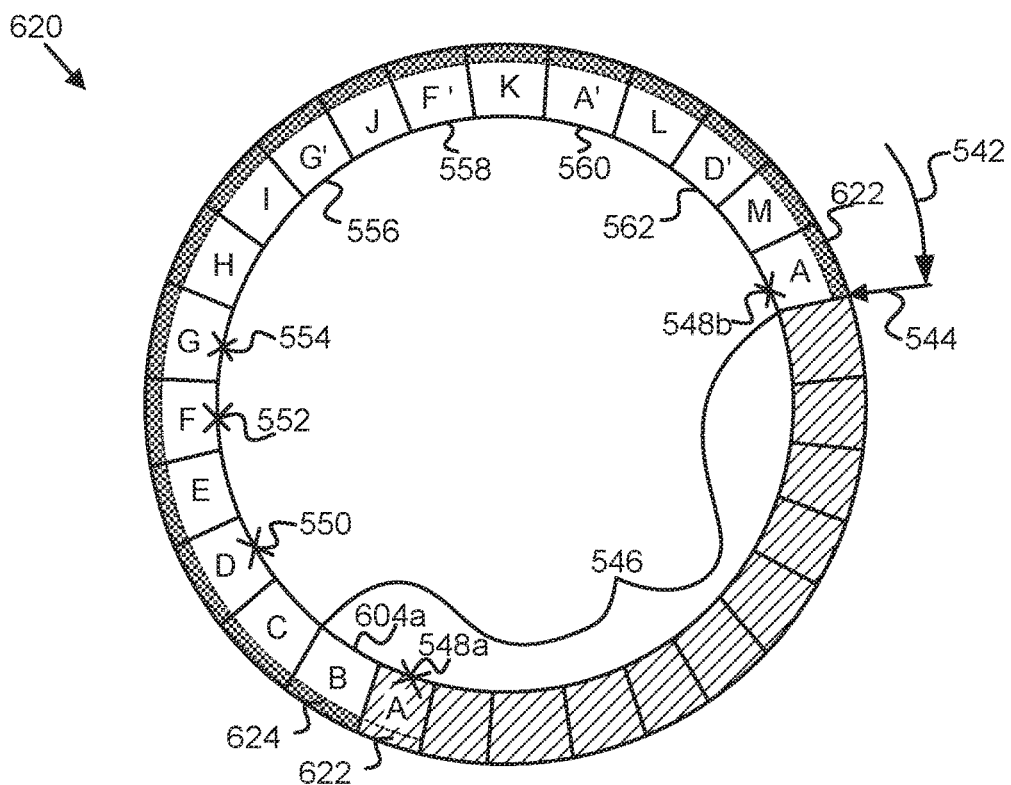
FIG. 6B is a schematic block diagram illustrating another embodiment of an epoch identifier.

FIG. 6B depicts another embodiment of a sequential, log-based writing structure 620 storing epoch identifiers 622, 624. In the sequential, log-based writing structure 620, the temporal order module 402 inserts or stores an epoch identifier 622, 624 into each individual data segment, such as a packet, an ECC chunk or block, a logical page, a physical page, a logical erase block, a physical erase block, an LBA data block or range of data blocks, a file, a data object, or another predefined segment of data. In certain embodiments, a transition between data segments with different epoch identifiers 622, 624 may mark a point for a snapshot in the sequential, log-based writing structure 620 (e.g., the creation module 304 may mark a creation or initialization point for a snapshot in cooperation with the temporal order module 402 by incrementing an epoch identifier 622, 624).

In the depicted embodiment, because each individual packet or other data segment includes an epoch identifier, the storage capacity recovery module 414 may recover the storage capacity of block 548a, with data 'A', copying or writing forward data 'A' to a block 548b at the append point 544, without copying or writing forward data 'B' from block 604a, which may be associated with the same epoch identifier 624. Data packets or other data segments of data 'A' in block 548a store epoch identifiers 622, which the temporal order module 402 and/or the storage capacity recovery module 414 copy or write forward with data 'A' to the new block 548b. The matching epoch identifiers 624a for data 'B' remain associated with data 'B', in each data packet or other data segment, in block 604a. In certain embodiments, storing an epoch identifier 622, 624 in each packet or other data segment may simplify storage capacity recovery operations for the storage capacity recovery module 414, as temporal ranges or epochs may be separated, without the data losing its association with the epoch identifiers 622, 644.

Figure 7:
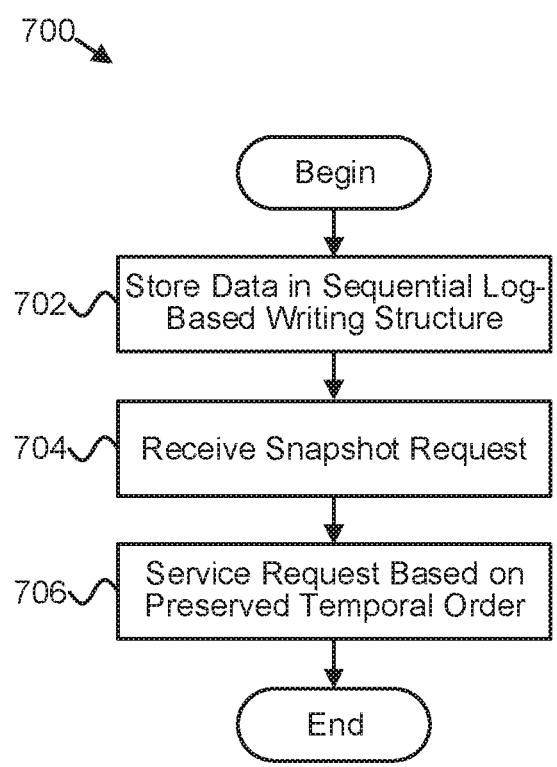
FIG. 7 is a schematic flow chart diagram illustrating one embodiment of a method for snapshots of data.

FIG. 7 depicts one embodiment of a method 700 for snapshots of data. The method 700 begins and the log storage module 302 stores 702 data in a sequential, log-based writing structure 540, 600, 620. The snapshot interface module 404 receives 704 a snapshot request from a client 116. The snapshot interface module 404 services 706 the received 704 snapshot request based on a temporal order of the data preserved in the sequential, log-based writing structure 540, 600, 620 and the method 700 ends.

Figure 8:
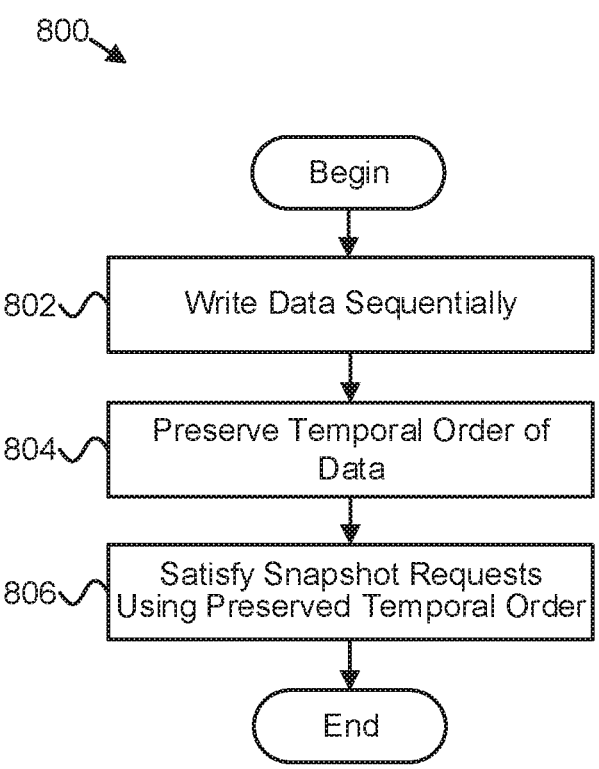
FIG. 8 is a schematic flow chart diagram illustrating another embodiment of a method for snapshots of data.

FIG. 8 depicts another embodiment of a method 800 for snapshots of data. The method 800 begins and the log storage module 302 writes 802 data sequentially to an append point 544 of a sequential, log-based writing structure 540, 600, 620. The temporal order module 402 preserves 804 a temporal order of the data in the sequential, log-based writing structure 540, 600, 620. The snapshot interface module 404 satisfies 806 snapshot requests using the preserved 804 temporal order and the method 800 ends.

Figure 9:
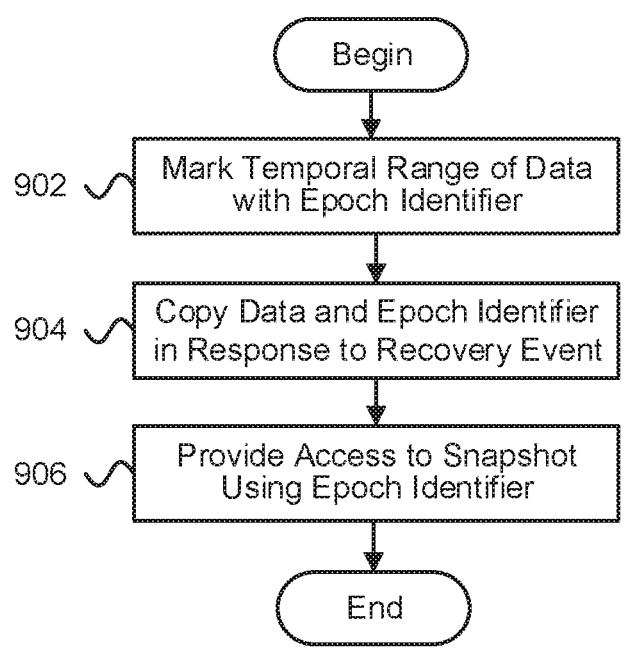
FIG. 9 is a schematic flow chart diagram illustrating a further embodiment of a method for snapshots of data.

FIG. 9 depicts a further embodiment of a method 900 for snapshots of data. The method 900 begins and the temporal order module 402 marks 902 a temporal range of data in a sequential, log-based writing structure 540, 600, 620 with an epoch identifier 602, 606, 608, 610, 612, 622, 624. The temporal order module 402 and/or the storage capacity recovery module 414 copies 904 at least a latest version of data in the temporal range and the epoch identifier 602, 606, 608, 610, 612, 622, 624 forward on the sequential, log-based writing structure 540, 600, 620 in response to a storage capacity recovery event. The snapshot interface module 404 provides 906 access to a snapshot of the temporal range of data using the epoch identifier 602, 606, 608, 610, 612, 622, 624.

Figure 10A:
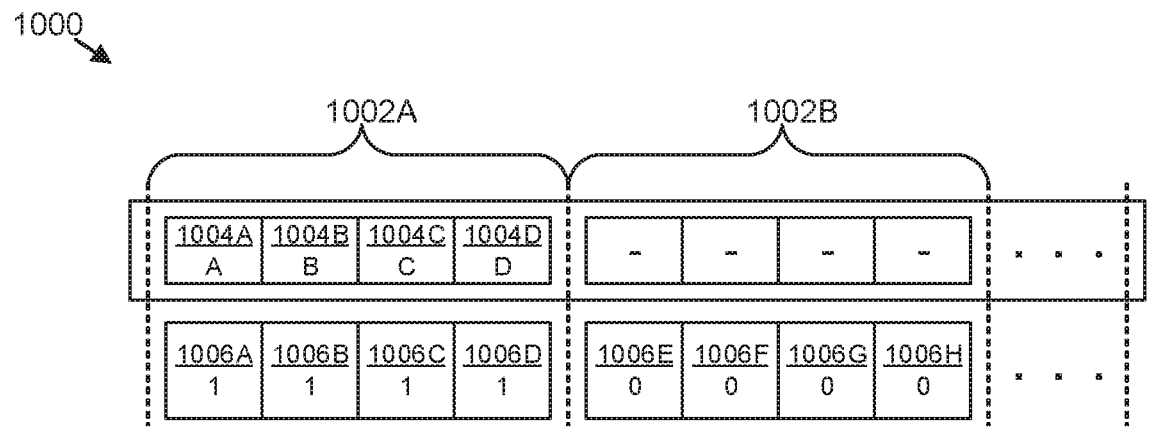
FIG. 10A is a schematic block diagram illustrating one embodiment of validity metadata.

FIG. 10A depicts one embodiment of validity metadata 1000 for a first data segment 1002A and a second data segment 1002B, such as logical or physical erase blocks or the like. Validity metadata for the first data segment 1002A indicates that each data packet 1004A-D are valid, with binary one values. The second data segment 1002B does not store any data, so the validity metadata 1006E-H indicates that the data is not valid, with binary zero values.

Figure 10B:
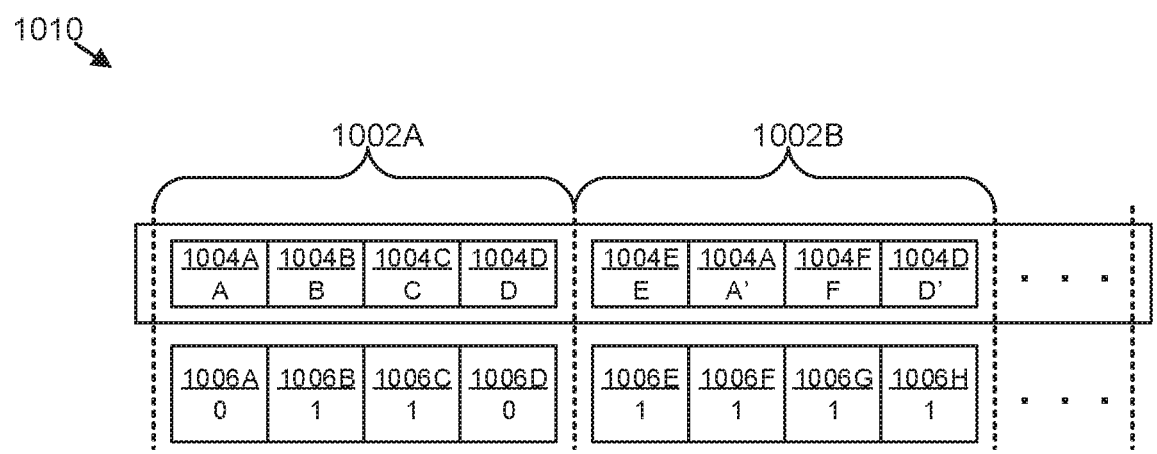
FIG. 10B is a schematic block diagram illustrating another embodiment of validity metadata.

FIG. 10B depicts a further embodiment of validity metadata 1010, where data packets 1004E, 1004A, 1004F, and 1004D have been written to the second data segment 1002B, invalidating data packet 1004A and 1004D in the first data segment 1002A, as indicated by the binary zero values for the validity metadata 1006A and 1006D. Thus, storage capacity of the data packets 1004A and 1004D of the first data segment 1002A may safely be reclaimed, and the associated storage capacity recovered.

Figure 11A:
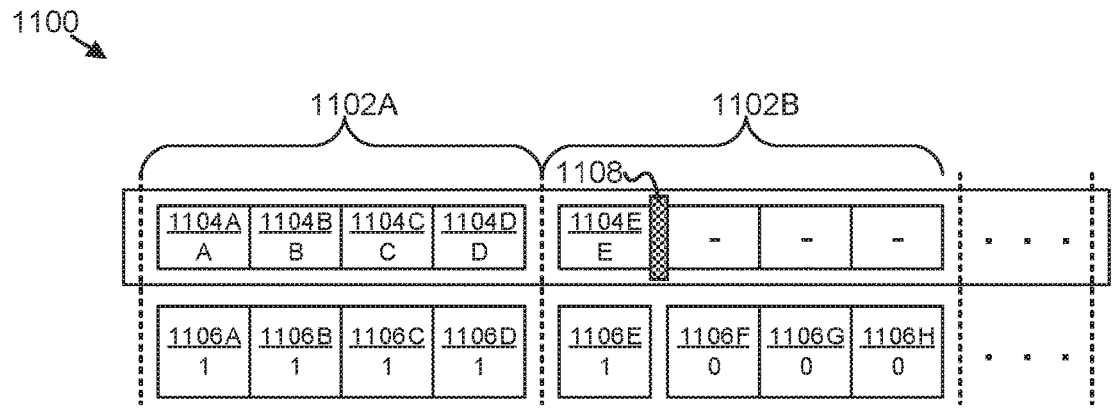
FIG. 11A is a schematic block diagram illustrating one embodiment of validity metadata.

FIG. 11A depicts another embodiment of validity metadata 1100 with per epoch validity maps 1106A-H. The example shows an embodiment with two epochs, divided by an epoch identifier 1108, spread over two storage regions 1102A-B with four data packets in each storage region 1102A-B. The validity map 1106A-E is associated with a snapshot created at the time the epoch identifier 1108 was written to the sequential, log-based writing structure. The validity map 1106A-E indicates that each of the five data packets are valid in the sequential, log-based writing structure. After creation of the snapshot, data packet 1104A is overwritten, and one validity bit and setting another. The bits that need to be cleared and set are shown in gray in Fig. B and clearly these belong to Epoch 1 and hence read-only. Thus, the first step is to create copies of these validity blocks (shown in step 1). Next, the bits in the newly created epoch 2 are set and cleared to represent the new state of the drive.

Figure 11B:
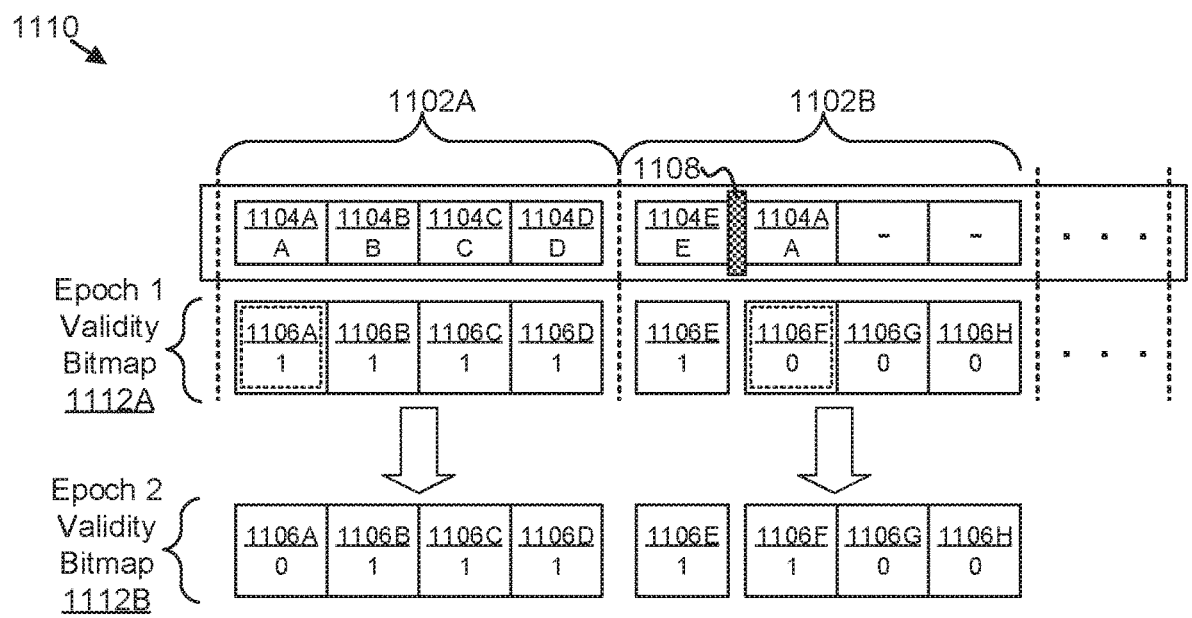
FIG. 11B is a schematic block diagram illustrating another embodiment of validity metadata.

FIG. 11B depicts an additional embodiment of validity metadata 1110. After creation of the snapshot in FIG. 11A (e.g., writing the epoch identifier 1108 to the sequential, log-based writing structure as a snapshot create indicator or note), the data packet 1104A is overwritten, and the validity module 406 clears one validity bit 1106A and sets another validity bit 1106F. To maintain validity metadata for both snapshots, before and after the epoch identifier 1108, the validity module 406 uses a copy-on write operation to copy the validity metadata 1106 and to update the entries 1106A and 1106F in the new copy validity bitmap 1112B for Epoch 2, so that the entries 1106A and 1106F remain the same for the validity bitmap 1112A for Epoch 1 and its associated snapshot.

Figure 12:
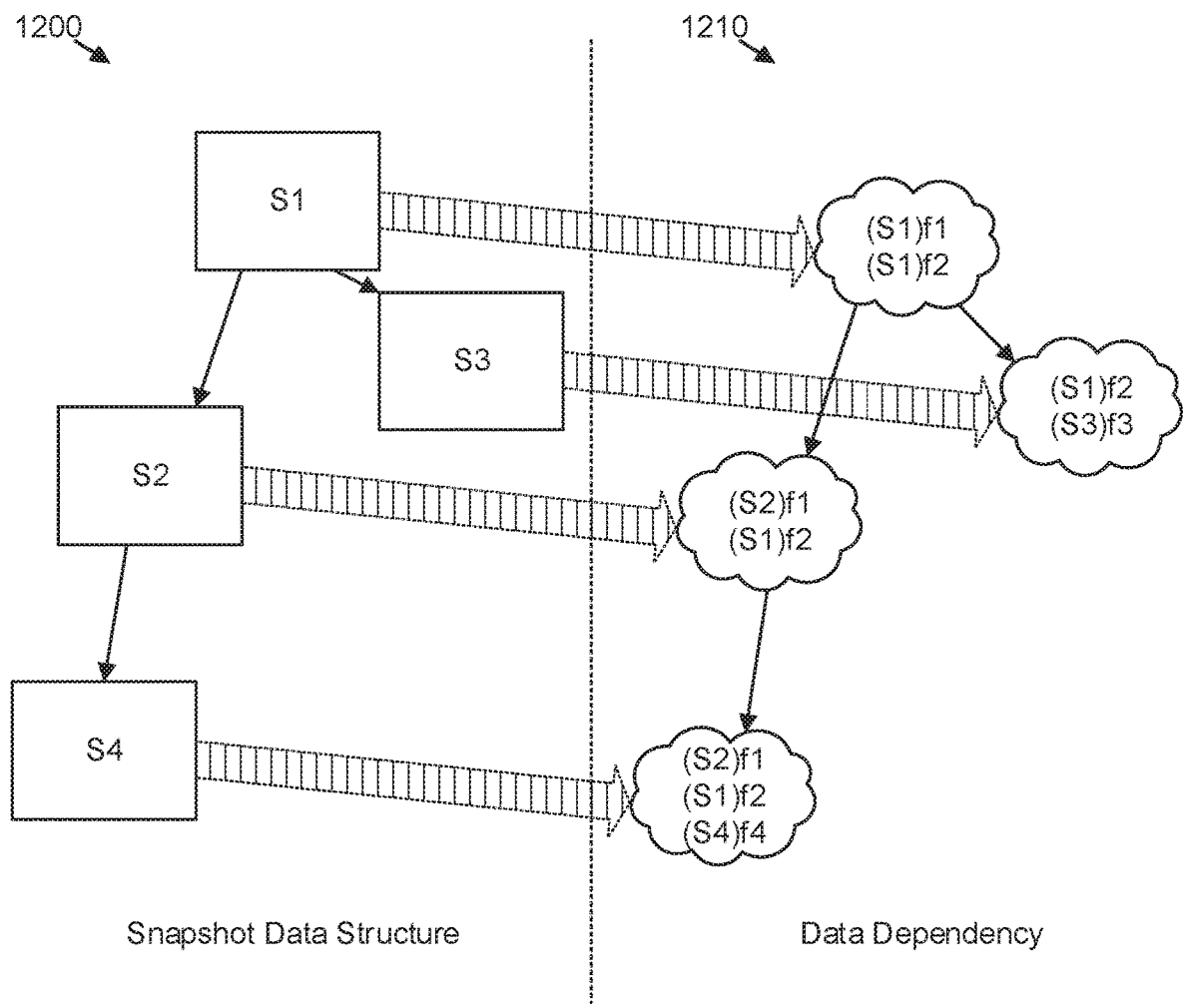
FIG. 12 is a schematic block diagram illustrating one embodiment of a snapshot data structure.

FIG. 12 depicts one embodiment of a snapshot data structure 1200, which defines data dependencies 1210 between a plurality of snapshots. Snapshots represent the state of the non-volatile memory device 120 at a particular point in time. In response to creation of a snapshot, the active state or snapshot of the non-volatile memory device 120 may be identical to a state captured by the snapshot. Thus, the active state inherits data blocks from the snapshot. In certain embodiments, where multiple snapshots are created, the snapshot data structure 1200 may track or define data dependencies 1210 for a chain or tree of snapshots which are in turn related to each other. The depicted example illustrates an embodiment where a snapshot 51 was created containing files f1 and f2. The snapshot data structure 1200 shows the relationship between snapshots and the data dependencies 1210 shows the data associated with each snapshot (as files for simplicity, with the snapshot a file originated from in parentheses). After modifications to file f1, snapshot S2 is created followed by S4 which adds a file f4. As depicted, the state captured by S4 includes files from snapshots 51 and S2. At some point, snapshot 51 were activated and file f2 was deleted and a new file f3 was created. Deleting file f2, in the depicted embodiment, does not affect the file stored in snapshot 51. Activations may create a fork in the snapshot data structure 1200, and the active fork, in the depicted embodiment, was eventually snapshotted again creating S3.

Figure 13:
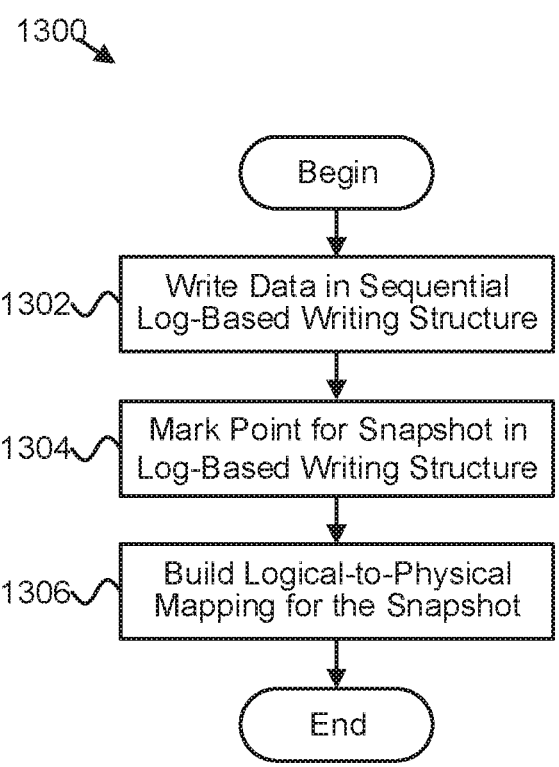
FIG. 13 is a schematic flow chart diagram illustrating one embodiment of a method for snapshots of data.

FIG. 13 depicts one embodiment of a method 1300 for snapshots of data. The method 1300 begins, and a log storage module 302 writes 1302 data in a sequential log structure for a non-volatile device 120. A creation module 304 marks 1304 a point, in a sequential log structure, for a snapshot of the data. An activation module 306 builds 1306 a logical-to-physical mapping for the snapshot based on the marked point and a temporal order for the data in the sequential log structure and the method 1300 ends.

Figure 14:
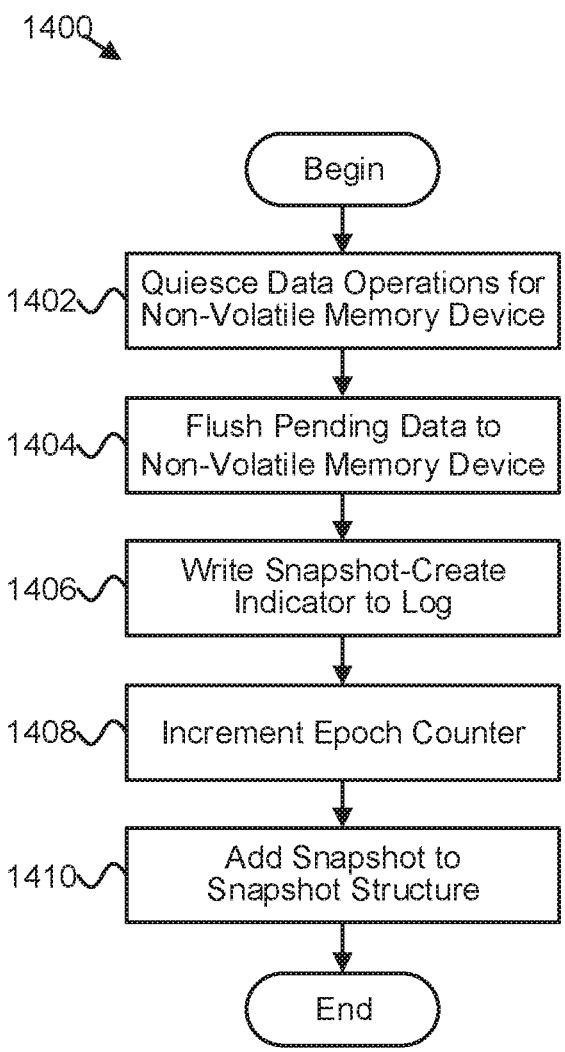
FIG. 14 is a schematic flow chart diagram illustrating one embodiment of a method for creating a snapshot of data.

FIG. 14 depicts one embodiment of a method 1400 for creating a snapshot of data. The method 1400 begins and the log storage module 302 quiesces 1402, pauses, stops, or holds data operations for the non-volatile memory device 120, in response to a snapshot create request or another snapshot creation event. The log storage module 302 flushes 1404 pending data from previously received storage requests, storage capacity recovery operations, or the like to the non-volatile memory device 120 for storage. The creation module 304 writes 1406 a snapshot-create indicator (e.g., an epoch identifier, an incremented epoch identifier, or the like) to the sequential, log-based writing structure. The temporal order module 402 increments 1408 an epoch counter and/or epoch identifier, thereby creating a new epoch for the new snapshot. The snapshot tracking module 408 adds 1410 the new snapshot to a snapshot data structure such as a snapshot tree and the method 1400 ends.

Figure 15:
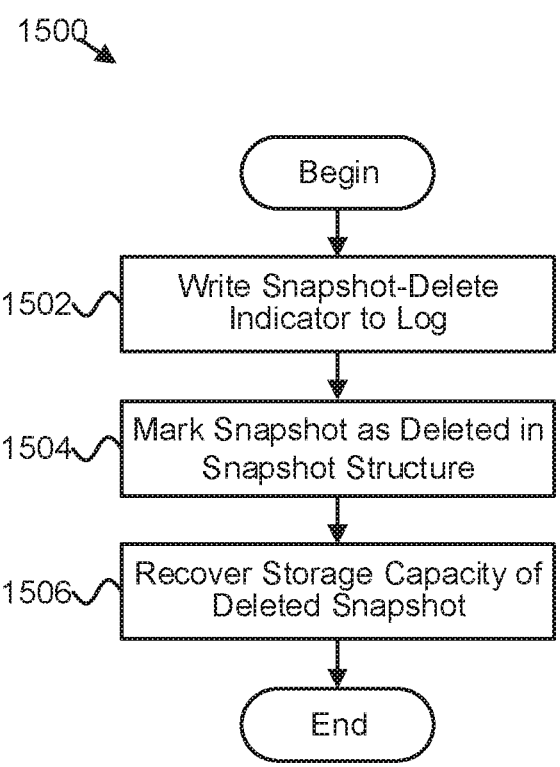
FIG. 15 is a schematic flow chart diagram illustrating one embodiment of a method for deleting a snapshot of data.

FIG. 15 depicts one embodiment of a method 1500 for deleting a snapshot of data. The method 1500 begins and the deletion module 410 writes 1502 a snapshot-delete indicator to the sequential, log-based writing structure for a snapshot to be deleted, in response to a snapshot delete request, the snapshot expiring, or the like. The snapshot tracking module 408 marks 1504 the snapshot as deleted in the snapshot data structure. The storage capacity recovery module 414 recovers 1506 storage capacity of the non-volatile memory media 122 associated with the deleted snapshot, during a background storage capacity recovery operation or the like, and the method 1500 ends.

Figure 16:
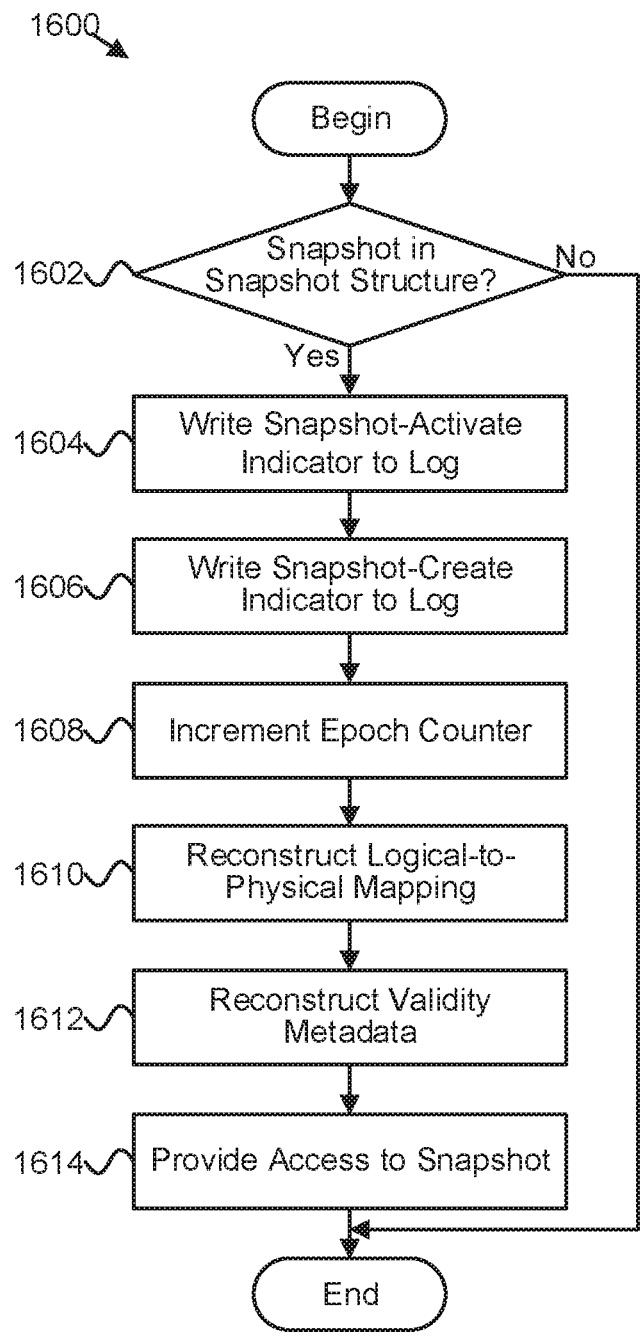
FIG. 16 is a schematic flow chart diagram illustrating one embodiment of a method for activating a snapshot of data.

FIG. 16 depicts one embodiment of a method 1600 for activating a snapshot of data. The method 1600 begins and the snapshot tracking module 408 determines whether the snapshot to be activated exists in the snapshot data structure. If the snapshot tracking module 408 determines 1602 that the snapshot does not exist, the method 1600 ends, returning an error or the like.

If the snapshot tracking module 408 determines 1602 that the snapshot exists in the snapshot data structure, thereby validating existence of the requested snapshot, the activation module 306 writes 1604 a snapshot activate indicator to the sequential, log-based writing structure, to ensure accurate reconstruction of a state of the non-volatile memory device 120 in response to a restart event or the like. The creation module 304 may write 1606 a snapshot create indicator to the sequential, log-based writing structure, creating a new epoch and/or snapshot that inherits valid data from the previous epoch and/or snapshot. The temporal order module 402 increments 1608 an epoch counter and/or epoch indicator.

The reconstruction module 416 reconstructs 1610 a logical-to-physical mapping structure for the requested snapshot and reconstructs 1612 validity metadata for the requested snapshot as described above. The snapshot interface module 404 provides 1614 access to the requested snapshot and the method 1600 ends. In certain embodiments, to deactivate the requested snapshot in response to a snapshot deactivation request or the like, the deactivation module 412 writes a snapshot deactivation indicator to the sequential, log-based writing structure and the snapshot tracking module 408 updates the snapshot data structure.

Figure 17:
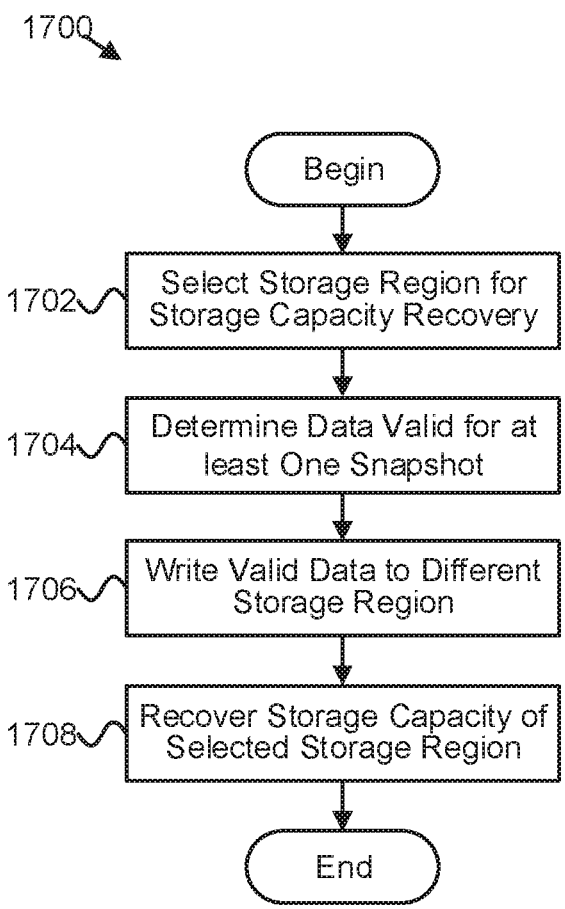
FIG. 17 is a schematic flow chart diagram illustrating one embodiment of a method for storage capacity recovery of snapshots of data.

FIG. 17 depicts one embodiment of a method 1700 for storage capacity recovery of snapshots of data. The method 1700 begins, and the storage capacity recovery module 414 selects 1702 a storage region (e.g., a logical or physical erase block) for storage capacity recovery. The storage capacity recovery module 414, in cooperation with the validity module 406 or the like, determines 1704 which data in the selected 1702 storage region is valid for at least one snapshot. The storage capacity recovery module 414 writes 1706 data determined 1704 to be valid forward on the sequential, log-based writing structure to a different storage region (e.g., to an append point). The storage capacity recovery module 414 recovers 1708 storage capacity of the selected 1702 storage region and the method 1700 ends.

A means for preserving a temporal order of data in a sequential writing structure in the presence of storage capacity recovery operations for the sequential writing structure, in various embodiments, may include a temporal order module 402, a storage capacity recovery module 414, a snapshot module 150, a log storage module 137, 248, 302, a storage management layer 130, a non-volatile memory controller 124, a non-volatile memory media controller 126, a non-volatile memory device 120, a write pipeline 240, other logic hardware, and/or other executable code stored on a computer readable storage medium. Other embodiments may include similar or equivalent means for preserving a temporal order of data in a sequential writing structure in the presence of storage capacity recovery operations.

A means for preserving a snapshot or other physical or logical copy of data at a point in time in a sequential writing structure, in various embodiments, may include a snapshot module 150, a creation module 304, a storage management layer 130, a non-volatile memory controller 124, a non-volatile memory media controller 126, a non-volatile memory device 120, other logic hardware, and/or other executable code stored on a computer readable storage medium. Other embodiments may include similar or equivalent means for creating a snapshot or other copy for data at a point in a sequential writing structure.

A means for activating a snapshot or other preserved copy at a later point in time based on a preserved temporal order of the data in a sequential writing structure, in various embodiments, may include a snapshot module 150, an activation module 306, a storage management layer 130, a non-volatile memory controller 124, a non-volatile memory media controller 126, a non-volatile memory device 120, other logic hardware, and/or other executable code stored on a computer readable storage medium. Other embodiments may include similar or equivalent means for activating a snapshot or other preserved copy at a later point in time.

A means for determining a logical-to-physical mapping structure and/or validity metadata for the preserved copy, in various embodiments, may include a snapshot module 150, a reconstruction module 416, an activation module 306, a storage management layer 130, a non-volatile memory controller 124, a non-volatile memory media controller 126, a non-volatile memory device 120, other logic hardware, and/or other executable code stored on a computer readable storage medium. Other embodiments may include similar or equivalent means for determining a logical-to-physical mapping structure and/or validity metadata.

A means for maintaining data in a sequential, log-based writing structure 540, 600, 620, in various embodiments, may include a log storage module 137, 248, 302, a snapshot module 150, a storage management layer 130, a non-volatile memory controller 124, a non-volatile memory media controller 126, a non-volatile memory device 120, non-volatile memory media 122, a write pipeline 240, other logic hardware, and/or other executable code stored on a computer readable storage medium. Other embodiments may include similar or equivalent means for maintaining data in a sequential, log-based writing structure 540, 600, 620.

A means for preserving, across a storage capacity recovery event, an order in which the data was written, in various embodiments, may include a temporal order module 402, a storage capacity recovery module 414, a snapshot module 150, a log storage module 137, 248, 302, a storage management layer 130, a non-volatile memory controller 124, a non-volatile memory media controller 126, a non-volatile memory device 120, a write pipeline 240, other logic hardware, and/or other executable code stored on a computer readable storage medium. Other embodiments may include similar or equivalent means for preserving, across a storage capacity recovery event, an order in which the data was written.

A means for accessing the data based on the order in which the data was written, in various embodiments, may include a snapshot interface module 404, a snapshot module 150, a storage management layer 130, a non-volatile memory controller 124, a non-volatile memory media controller 126, a non-volatile memory device 120, a read pipeline 241, other logic hardware, and/or other executable code stored on a computer readable storage medium. Other embodiments may include similar or equivalent means for accessing the data based on the order in which the data was written.

A means for asynchronously replicating the data, at a remote location, in the order in which the data was written, in various embodiments, may include a snapshot interface module 404, a snapshot module 150, a storage management layer 130, a non-volatile memory controller 124, a read pipeline 241, a storage client 116, other logic hardware, and/or other executable code stored on a computer readable storage medium. Other embodiments may include similar or equivalent means for asynchronously replicating the data, at a remote location, in the order in which the data was written.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
   writing data in a sequential log structure comprising blocks of a data storage device, each block of data comprising an epoch identifier for temporally ordering the blocks of data;
   preserving the temporal order of the data in the sequential log structure in response to a storage capacity recovery event for one or more of the blocks of the data storage device that copies data forward in the sequential log structure from the one or more blocks to a different block of the blocks at an append point of the sequential log structure, wherein, in response to multiple blocks of data comprising the same epoch identifier and the storage capacity recovery event recovering storage capacity from a subset of the multiple blocks of data that comprise the same epoch identifier, preserving the temporal order of the multiple blocks of data comprises copying the epoch identifier associated with the data of each of the subset of the multiple blocks of data forward with the data to the different block at the append point such that the multiple blocks of data that comprise the same epoch identifier are logically separated within the sequential log structure without losing their association with the same epoch identifier;
   invalidating data stored at the one or more blocks by the storage capacity recovery event to recover storage capacity of the data storage device while retaining the data and the temporal order of the data in the sequential log structure based on copying the data and the epoch identifier associated with the data forward in the sequential log structure;
   receiving a time sequence request from a client; and
   servicing the time sequence request by providing access to data from the data storage device based on the temporal order of the data in the sequential log structure preserved by copying the epoch identifier associated with the data to the different block at the append point.

2. The method of claim 1, wherein the storage capacity recovery event writes valid data from the one or more blocks to the append point of the sequential log structure.

3. The method of claim 2, wherein the temporal order of the data is preserved by associating a temporal range of data with one of the one or more epoch identifiers.

4. The method of claim 3, further comprising storing the epoch identifier associated with the temporal range of data in one or more metadata headers of the temporal range of data.

5. The method of claim 3, further comprising storing the epoch identifier associated with the temporal range of data in the sequential log structure, the epoch identifier marking the temporal range of data.

6. The method of claim 2, wherein preserving the temporal order of the data in response to the storage capacity recovery event comprises retaining at least one version of data from each of a plurality of epochs.

7. The method of claim 1, wherein:
the time sequence request comprises a snapshot request; and
servicing the time sequence request comprises providing a snapshot of data from a point in time based on the temporal order.

8. The method of claim 1, wherein:
the time sequence request comprises a delta clone request; and
servicing the time sequence request comprises providing, to the client, changes to the data between points in time based on the temporal order.

9. The method of claim 8, wherein the changes to the data are provided in one or more of the temporal order and a logical address order for the data.

10. The method of claim 1, wherein:
the time sequence request comprises a rollback request; and
servicing the time sequence request comprises providing access to a previous state of the data based on the temporal order.

11. The method of claim 10, further comprising providing access to a state of the data adjacent in time to the previous state based on the temporal order in response to an iterate request.

12. The method of claim 10, further comprising determining a logical-to-physical mapping for the previous state of the data based on the temporal order, the logical-to-physical mapping comprising a mapping between logical addresses of the data and physical locations for the previous state of the data in the sequential log structure.

13. The method of claim 10, wherein the previous state comprises a state of the data prior in the temporal order to a failed operation.

14. The method of claim 1, wherein:
the time sequence request comprises an asynchronous replication request; and
servicing the time sequence request comprises asynchronously replicating the data, in the temporal order, to a different storage location.

15. An apparatus comprising:
a log storage module configured to store data sequentially to an append point of a sequential, chronologically ordered writing structure, the data comprising a span identifier for temporally ordering the data;
a temporal order module configured to preserve a chronological order of the data in the sequential, chronologically ordered writing structure in response to a storage capacity recovery event that copies data forward in the sequential, chronologically ordered writing structure, wherein, in response to a plurality of the data comprising the same span identifier and the storage capacity recovery event recovering storage capacity from a subset of the plurality of data that comprise the same span identifier, preserving the chronological order of the plurality of data comprises copying the span identifier associated with each of the subset of the plurality of data forward with the data such that the plurality of data that comprise the same span identifier are logically separated within the sequential, chronologically ordered writing structure without losing their association with the same span identifier;
a storage capacity recovery module configured to invalidate an original version of the data by the storage capacity recovery event to recover storage capacity while retaining the data and the chronological order of the data in the sequential, chronologically ordered writing structure based on copying the data and the span identifier associated with the data forward in the sequential, chronologically ordered writing structure; and
a time sequence interface module configured to satisfy time sequence requests, by providing access to data from the sequential, chronologically ordered writing structure, using the chronological order,
wherein at least a portion of the log storage module, the temporal order module, and the time sequence interface module comprise one or more of hardware and executable code, the executable code stored on one or more non-transitory computer readable storage media.

16. The apparatus of claim 15, wherein the temporal order module is further configured to preserve the chronological order by associating a chronological span of data with the span identifier.

17. The apparatus of claim 16, further comprising a storage capacity recovery module configured to copy the chronological span of data and the span identifier forward to a different append point of the sequential, chronologically ordered writing structure than an intake append point in response to the storage capacity recovery event.

18. The apparatus of claim 16, wherein the temporal order module is further configured to increment the span identifier for association with a subsequent chronological span of data in response to a time sequence request comprising a new span request.

19. An apparatus comprising:
means for maintaining data in a sequential log writing structure, the data comprising an epoch identifier for temporally ordering the data;
means for preserving, in response to a storage capacity recovery event that copies data forward in the sequential log writing structure, a chronological order in which the data is written, wherein, in response to a plurality of the data comprising the same epoch identifier and the storage capacity recovery event recovering storage capacity from a subset of the plurality of data that comprise the same epoch identifier, preserving the chronological order of the plurality of data comprises copying the epoch identifier associated with each of the subset of the plurality of the data forward with the data such that the plurality of data that comprise the same epoch identifier are logically separated within the sequential log writing structure without losing their association with the same epoch identifier;
means for invalidating an original version of the data by the storage capacity recovery event to recover storage capacity while retaining the data and the chronological order of the data in the sequential log writing structure based on copying the data and the epoch identifier associated with the data forward in the sequential log writing structure; and means for accessing the data based on the chronological order in which the data is written.

20. The apparatus of claim 19, further comprising means for asynchronously replicating the data, at a remote location, in the chronological order in which the data is written.

\* \* \* \* \*